(12) United States Patent
de La Jonquière

(10) Patent No.: US 12,062,364 B2
(45) Date of Patent: Aug. 13, 2024

(54) MEMORY ALLOCATION FOR KEYWORD SPOTTING ENGINES

(71) Applicant: Sonos, Inc., Santa Barbara, CA (US)

(72) Inventor: Hubert de Taffanel de La Jonquière, Paris (FR)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 18/448,502

(22) Filed: Aug. 11, 2023

(65) Prior Publication Data

US 2024/0105167 A1    Mar. 28, 2024

Related U.S. Application Data

(63) Continuation of application No. 17/303,066, filed on May 19, 2021, now Pat. No. 11,727,919.

(60) Provisional application No. 63/027,500, filed on May 20, 2020.

(51) Int. Cl.
| | |
|---|---|
| *G10L 15/00* | (2013.01) |
| *G06N 3/04* | (2023.01) |
| *G06N 3/08* | (2023.01) |
| *G10L 15/02* | (2006.01) |
| *G10L 15/16* | (2006.01) |
| *G10L 15/22* | (2006.01) |
| *G10L 15/08* | (2006.01) |

(52) U.S. Cl.
CPC ............ *G10L 15/16* (2013.01); *G06N 3/04* (2013.01); *G06N 3/08* (2013.01); *G10L 15/02* (2013.01); *G10L 15/22* (2013.01); *G10L 2015/088* (2013.01)

(58) Field of Classification Search
CPC ......... G10L 15/16; G10L 25/27; G10L 25/30; G10L 19/005; G10L 19/00; G10L 15/02; G10L 15/063; G10L 15/08; G10L 15/14; G10L 15/197; G10L 15/1815; G10L 15/07; G10L 15/20; G10L 15/22; G10L 15/26; G10L 15/30; G10L 25/87
See application file for complete search history.

*Primary Examiner* — Vu B Hang
(74) *Attorney, Agent, or Firm* — Fortem IP LLP

(57) ABSTRACT

Network microphone devices configured to detect keywords can include microphones for capturing sound samples. Features can be extracted from the sound samples by storing the sound samples in a first portion of a dynamic-access memory block, performing first computations based on spectral coefficients of the sound samples using a second portion of the memory block, and storing results of the first computations as extracted features in a third portion of the memory block. The second and third portions of the memory block can be designated as temporary memory. The extracted features are then processed using a neural network by storing the extracted features in a fourth portion of the memory block, performing second computations on the extracted features using the temporary memory, the second computations comprising computing at least one layer of the neural network, and storing an output of the neural network as a classification in the temporary memory.

20 Claims, 15 Drawing Sheets

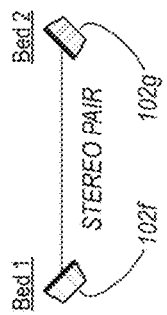
Fig. 3B
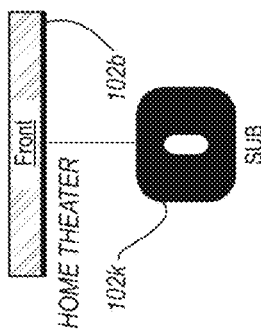
Fig. 3C
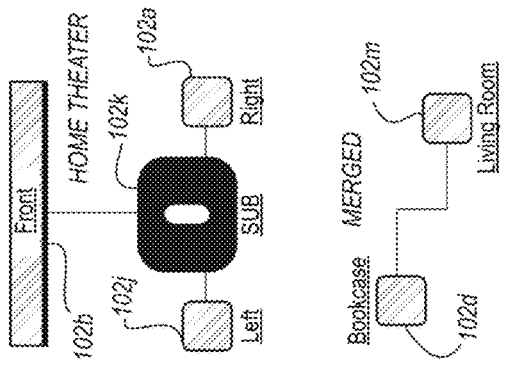
Fig. 3D
Fig. 3E
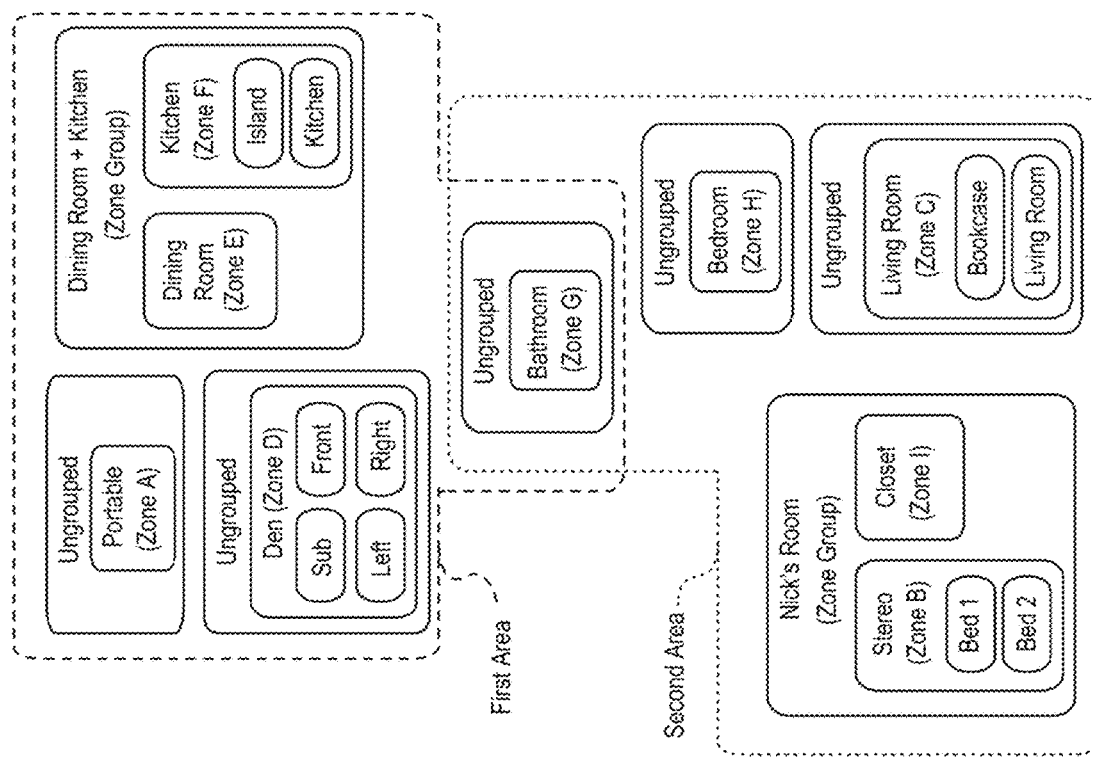
Fig. 3A

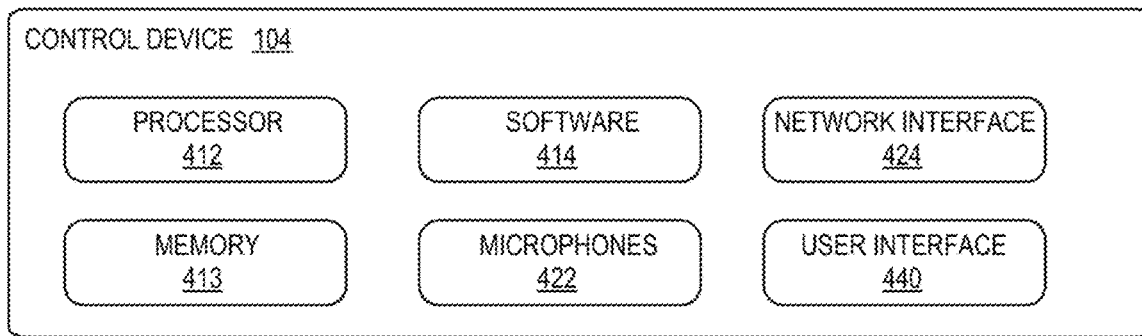
Fig. 4
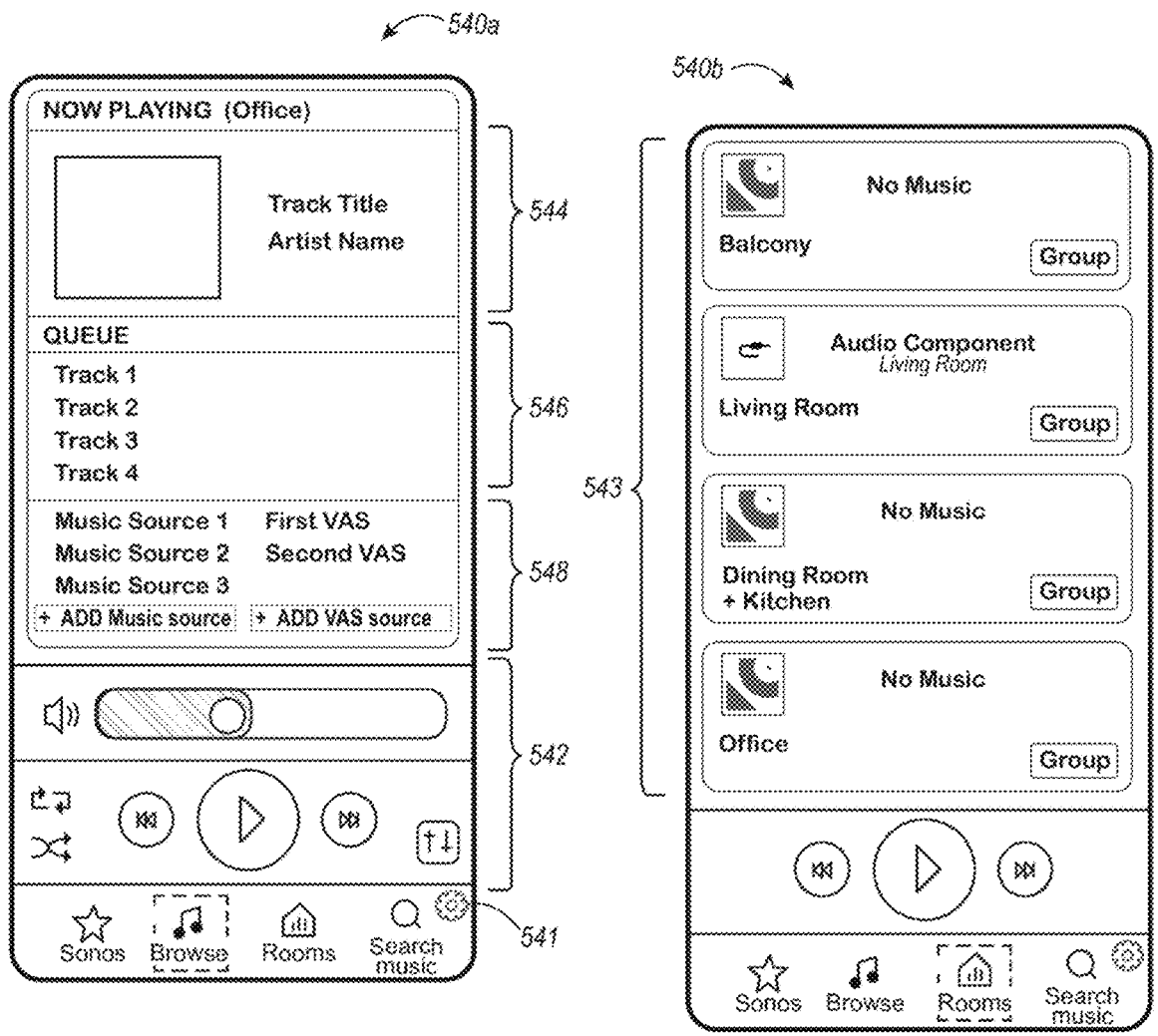
Fig. 5A
Fig. 5B

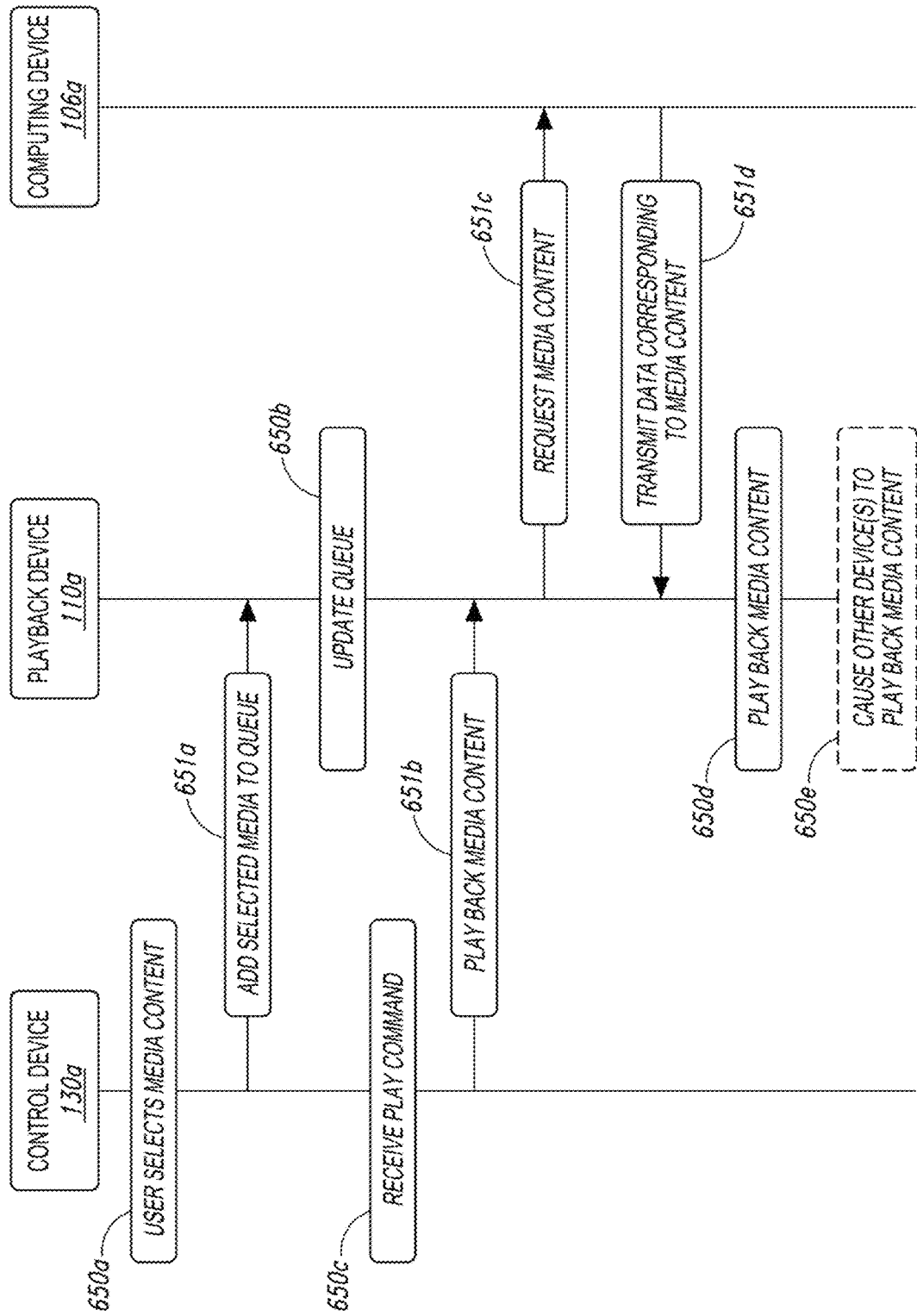

FIG. 11

Temporary Memory

| | |
|---|---|
| T0 | |
| T1 | Extr. Comp. |
| T2 | Eval. Output 1 / Eval. Comp. 1 |
| T3 | Eval. Output 1 / Eval. Output 2 / Eval. Comp. 2 |
| T4 | Eval. Output 3 / Eval. Output 2 / Eval. Comp. 2 |
| T5 | Eval. Output 3 / Eval. Comp. 4 |

Persistent Memory

| | | | |
|---|---|---|---|
| T0 | Extr. Input 1 | | |
| T1 | Extr. Input 1 | Extr. Output 1 | Eval. Input 1 |
| T2 | Extr. Input 1 | Extr. Output 1 | Eval. Input 1 |
| T3 | Extr. Input 1 | Extr. Output 1 | Eval. Input 1 |
| T4 | Extr. Input 1 | Extr. Output 1 | Eval. Input 1 |
| T5 | Extr. Input 1 | Extr. Output 1 | Eval. Input 1 / Eval. Output 4 |

FIG. 12

Temporary Memory

| | |
|---|---|
| T0 | |
| T1 | Extr. Output 1 |
| T2 | Extr. Output 1 / Extr. Comp. |
| T3 | Eval. Output 1 / Eval. Input 1 |
| T4 | Eval. Output 1 / Eval. Comp. 1 |
| T5 | Eval. Output 3 / Eval. Output 2 / Eval. Comp. 2 |
| T6 | Eval. Output 3 / Eval. Comp. 4 |

Persistent Memory

| | | | | | |
|---|---|---|---|---|---|
| T0 | Extr. Input 1 | | | | |
| T1 | Extr. Input 1 | | | | |
| T2 | Extr. Input 1 | | | | |
| T3 | Extr. Input 1 | Cntxt 1 | | | |
| T4 | Extr. Input 1 | Cntxt 1 | Ctxt 2 | | |
| T5 | Extr. Input 1 | Cntxt 1 | Ctxt 2 | Ctxt 3 | |
| T6 | Extr. Input 1 | Cntxt 1 | Ctxt 2 | Ctxt 3 | Ctxt 4 / Eval. Output 4 |

MEMORY ALLOCATION FOR KEYWORD SPOTTING ENGINES

CROSS-REFERENCE TO RELATED APPLICATION

This application is a continuation of U.S. patent application Ser. No. 17/303,066, filed May 19, 2021, now U.S. Pat. No. 11,727,919, which claims the benefit of priority to U.S. Patent Application No. 63/027,500, filed May 20, 2020, each of which is incorporated herein by reference in its entirety.

FIELD OF THE DISCLOSURE

The present technology relates to consumer goods and, more particularly, to methods, systems, products, features, services, and other elements directed to voice-assisted control of media playback systems or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIGS. 3A, 3B, 3C, 3D and 3E are diagrams showing example playback device configurations in accordance with aspects of the disclosure.

FIG. 4 is a functional block diagram of an example controller device in accordance with aspects of the disclosure.

FIGS. 5A and 5B are controller interfaces in accordance with aspects of the disclosure.

FIG. 6 is a message flow diagram of a media playback system.

FIGS. 11 and 12 illustrate example memory allocations in accordance with aspects of the disclosure.

Figure 1A:
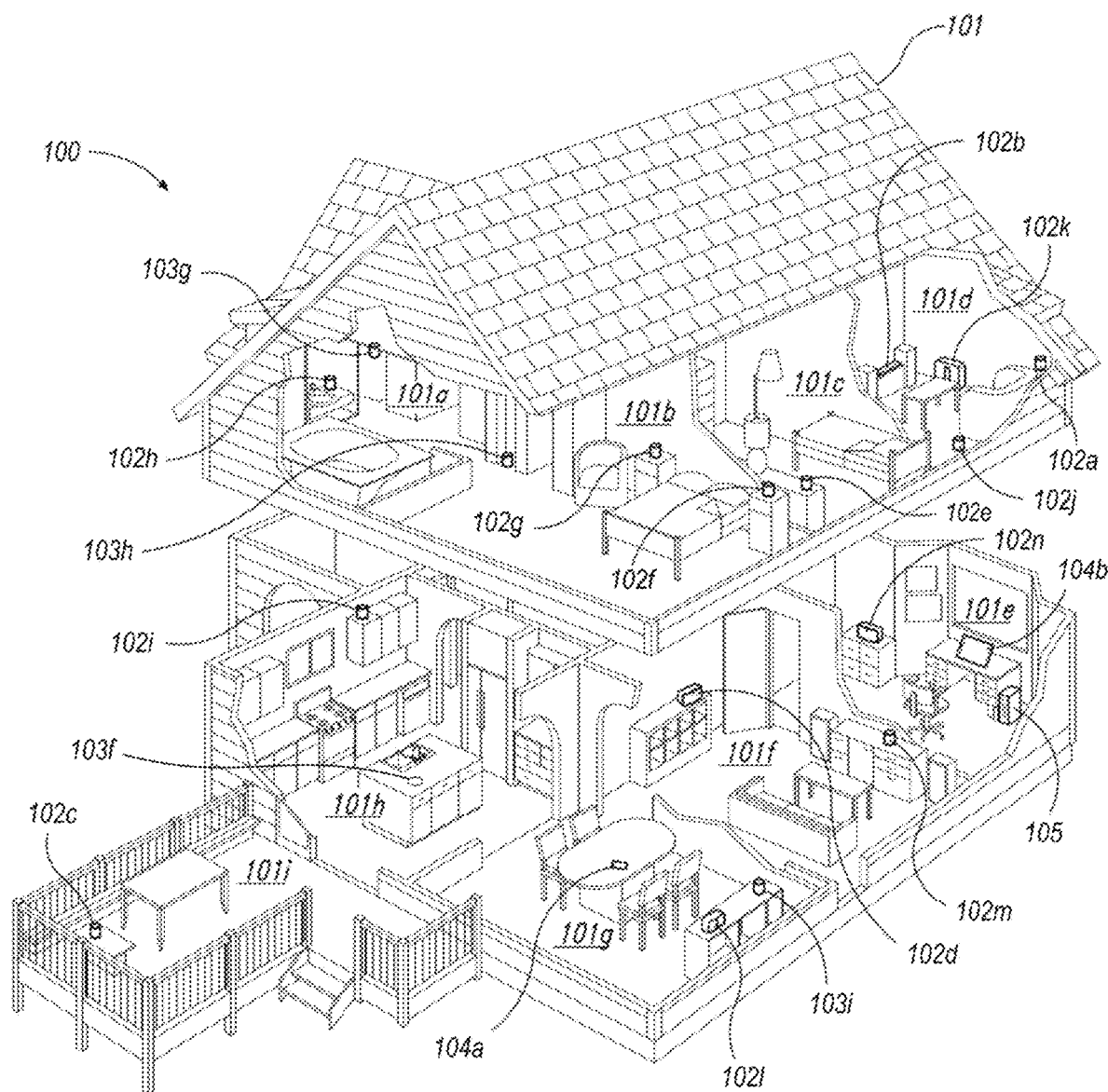
FIG. 1A is a partial cutaway view of an environment having a media playback system configured in accordance with aspects of the disclosed technology.

The drawings are for purposes of illustrating example embodiments, but it should be understood that the inventions are not limited to the arrangements and instrumentality shown in the drawings. In the drawings, identical reference numbers identify at least generally similar elements. To facilitate the discussion of any particular element, the most significant digit or digits of any reference number refers to the Figure in which that element is first introduced. For example, element 103a is first introduced and discussed with reference to FIG. 1A.

DETAILED DESCRIPTION

I. Overview

Example techniques described herein involve keyword engines configured to detect commands. An example network microphone device ("NMD") may implement such a keyword engine, for example to detect user commands, such as "play" or "skip." Network microphone devices may be used facilitate voice control of smart home devices, such as wireless audio playback devices, illumination devices, appliances, and home-automation devices (e.g., thermostats, door locks, etc.). An NMD is a networked computing device that typically includes an arrangement of microphones, such as a microphone array, that is configured to detect sound present in the NMD's environment. In some examples, an NMD may be implemented within another device, such as an audio playback device.

A keyword that invokes a command (referred to herein as a "command keyword") may be a word or a combination of words (e.g., a phrase) that functions as a command itself, such as a playback command. In some implementations, a command keyword may function as both a wake word and the command itself. That is, when a keyword engine detects a command keyword in audio input, the NMD may determine that a command-keyword event has occurred and responsively performs a command corresponding to the detected keyword. For instance, based on detecting the command keyword "pause," the NMD causes playback to be paused. One advantage of a keyword engine is that the recorded audio does not necessarily need to be sent to remote computing devices (e.g., a remote voice assistant service) for processing, which may result in a quicker response to the voice input as well as increased user privacy, among other possible benefits. In some implementations described below, a detected command-keyword event may cause one or more subsequent actions, such as local natural language processing of a voice input.

According to example techniques described herein, after detecting a command keyword, example NMDs may generate a command-keyword event (and perform a command corresponding to the detected command keyword). For instance, after detecting the command keyword "skip," an example NMD generates a command-keyword event (and skips to the next track).

A local keyword engine (e.g., a keyword engine stored on an NMD) may include a limited library of keywords and corresponding components configured to recognize library keywords within audio input. In contrast to a keyword engine implemented in one or more cloud servers that is capable of recognizing a wide variety of voice inputs, example local keyword engines may be capable of recognizing a relatively small library of keywords (e.g., 5, 10, 100, 1,000, 10,000 intents, words and/or phrases), which facilitates practical implementation on the NMD. When the keyword engine generates a command-keyword event after detecting a command keyword in a voice input, the local keyword engine may process the voice input to look for keywords from the library and determine an intent from the found keywords.

One possible advantage of a local keyword engine is increased privacy. By processing voice input locally, a user may avoid transmitting voice recordings to the cloud (e.g., to servers of a voice assistant service). Further, in some implementations, the NMD may use a local area network to discover playback devices and/or smart devices connected to the network, which may avoid providing this data to the cloud. Also, the user's preferences and customizations may remain local to the NMD(s) in the household, perhaps only using the cloud as an optional backup. Other advantages are possible as well.

Local keyword engines may employ audio processing techniques generated using machine learning. For example, local keyword engines may use neural network models or other suitable approaches to analyze sound data and detect keywords within audio input. In some instances, audio input may first be processed to extract features to be used as inputs for the neural network model. For example, the keyword engine may process the audio input to extract mel frequency cepstral coefficients (MFCC) or other suitable features. The features may then be provided as inputs to a neural network or other suitable evaluation algorithm that has been trained on a suitable dataset to facilitate keyword detection in audio input.

To perform local keyword detection, the keyword engine may employ a processing device, such as a microcontroller unit (MCU) or other suitable hardware. Additionally, the keyword engine may include local memory to be used for storing parameters of the neural network model and feature extraction, as well as to provide working memory to perform computational tasks associated with processing the audio input for keyword detection. Such memory can include permanent memory configured to store data over extended periods (e.g., data associated with the neural network model) as well as non-permanent memory configured to store data for use over more limited periods (e.g., sound input data, keyword detection outputs, etc.). As used herein, "permanent memory" includes non-volatile memory such as flash memory, read-only memory, etc. that is configured to store data that is maintained even when the NMD is powered down and/or the keyword engine is inactive. As used herein, "non-permanent memory" includes volatile memory such as dynamic random-access memory (DRAM) that is configured to store data that is only used dynamically for performing computations, and need not be maintained while the NMD is powered down and/or the keyword engine is inactive. Such non-permanent memory may provide faster read access, and so facilitate use for dynamic computations.

Because keyword detection can be highly memory-intensive (especially with respect to neural network processing), it is advantageous to utilize the non-permanent memory in the most efficient manner possible. In operation, the non-permanent memory be required to store data associated with various sub-tasks of keyword detection. For example, the non-permanent memory may store, at various times: (1) inputs to a feature extractor (e.g., sound samples), (2) computations associated with extracting features from the sound samples, (3) an output of extracted sound samples, (4) input(s) to a feature evaluator algorithm (e.g., a neural network model), (5) computations associated with evaluating the features, and (6) outputs of the feature evaluator algorithm (e.g., an output classification from a neural network model). One conventional approach to allocating non-permanent memory for keyword detection is to assign separate portions of the non-permanent memory for each of these data types, with the amount of memory for each portion being sized to accommodate the maximum required data for that data type during the keyword-detection process.

In some embodiments of the present technology, non-permanent memory can be more efficiently allocated in a local keyword engine by permitting at least a portion of the data in the non-permanent memory to be overwritten dynamically during processing of audio input. In other words, rather than allocating discrete memory portions to each of the data types outlined above, two or more of the above-noted data types can share memory resources. As described in more detail below, because at least portions of the audio processing are performed serially, later steps may utilize the non-permanent memory by overwriting data that was required for previous steps. For example, a portion of memory may be allocated to computational space both for feature extraction and for feature evaluation. Because extraction is performed first, the allocated memory may first be used to store data associated with the feature extraction computations. Later, when performing feature evaluation computations, the allocated memory may be at least partially overwritten to store data associated with the feature evaluation computations. Accordingly, by sharing memory resources, the non-permanent memory can be utilized more efficiently.

Within the non-permanent memory, some data types may be permitted to be overwritten continuously, while it may be useful or necessary to store other data types for longer periods of time. For example, the non-permanent memory can store inputs to feature extractor model (e.g., captured sound data). These inputs can be captured as frames (e.g., 10 ms of sound data), and the feature extractor may evaluate a plurality of frames together (e.g., the most recent 10 frames). With each subsequent iteration, a new frame of sound data is stored as input, and the oldest frame of sound output is overwritten. In such a configuration, a particular frame of sound data input may need to persist for 10 iterations or computational cycles (as used here, a "computational cycle"

includes processing of a single new frame of sound data input—in some instances, extracting features from the new frame can include evaluating the new frame of sound data input in addition to the previous N frames). As such, although sound data input need only be stored temporarily, the sound data input may need to be stored for a longer period of time than, for example, the data associated with computing the feature extraction.

Accordingly, the non-permanent memory can be divided between temporary memory and persistent memory. As used herein, "temporary memory" includes a portion of non-permanent memory that is configured to be overwritten continuously, or at least at a higher rate than the persistent memory. For example, data stored within the "persistent" memory may be stored for a number of computational cycles of the keyword engine, while data stored within the "temporary" memory may be at least partially overwritten with each subsequent computational cycle. By advantageously allocating memory among the temporary and persistent portions of the non-permanent memory (e.g., DRAM), the non-permanent memory can be utilized more efficiently, saving cost and/or enabling the use of more complex computational processes for detecting keywords in sound data.

While some embodiments described herein may refer to functions performed by given actors, such as "users" and/or other entities, it should be understood that this description is for purposes of explanation only. The claims should not be interpreted to require action by any such example actor unless explicitly required by the language of the claims themselves.

Moreover, some functions are described herein as being performed "based on" or "in response to" another element or function. "Based on" should be understood that one element or function is related to another function or element. "In response to" should be understood that one element or function is a necessary result of another function or element. For the sake of brevity, functions are generally described as being based on another function when a functional link exists; however, such disclosure should be understood as disclosing either type of functional relationship.

II. Example Operation Environment

Figure 1B:
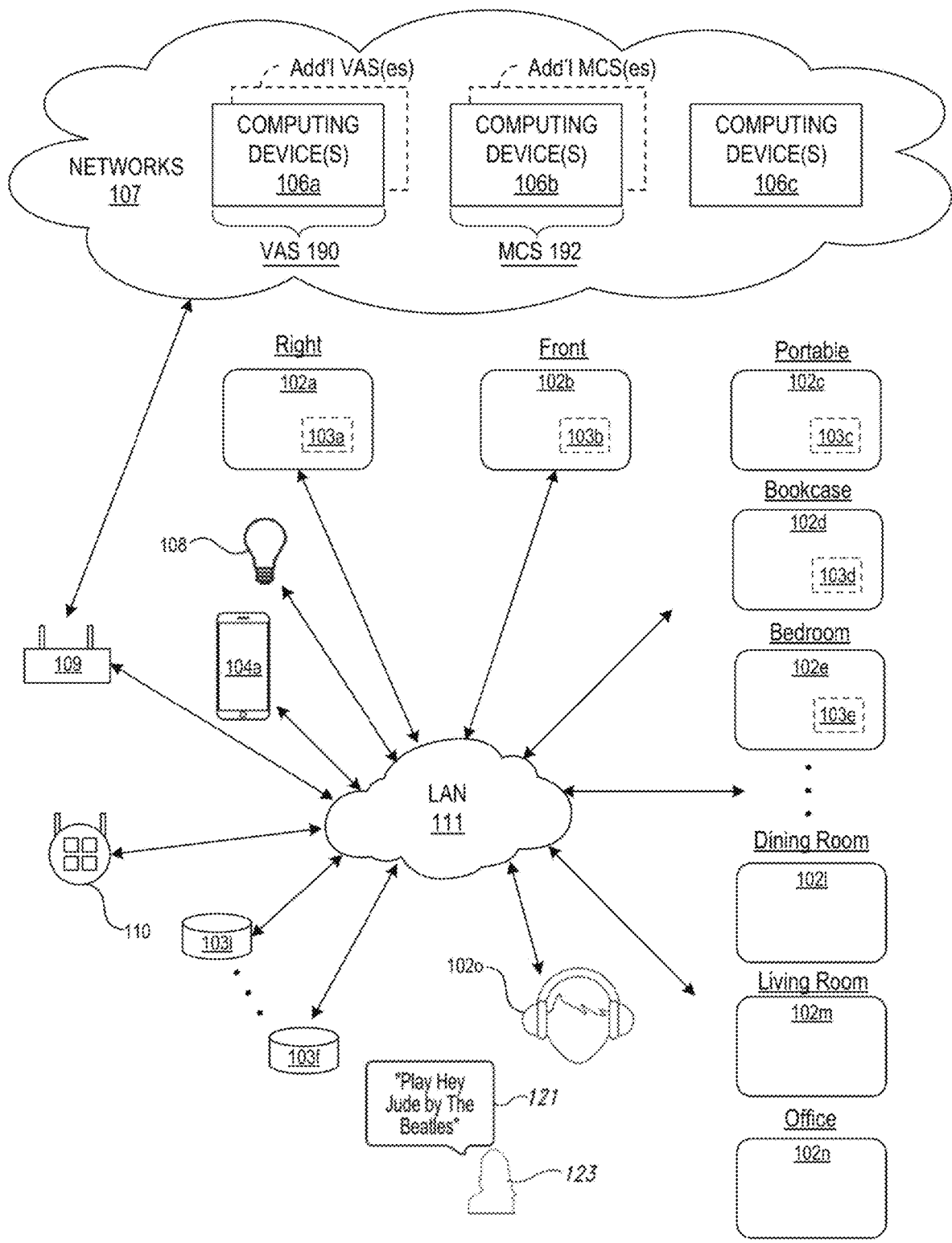
FIG. 1B is a schematic diagram of the media playback system of FIG. 1A and one or more networks.

FIGS. 1A and 1B illustrate an example configuration of a media playback system 100 (or "MPS 100") in which one or more embodiments disclosed herein may be implemented. Referring first to FIG. 1A, the MPS 100 as shown is associated with an example home environment having a plurality of rooms and spaces, which may be collectively referred to as a "home environment," "smart home," or "environment 101." The environment 101 comprises a household having several rooms, spaces, and/or playback zones, including a master bathroom 101a, a master bedroom 101b, (referred to herein as "Nick's Room"), a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

Within these rooms and spaces, the MPS 100 includes one or more computing devices. Referring to FIGS. 1A and 1B together, such computing devices can include playback devices 102 (identified individually as playback devices 102a-102o), network microphone devices 103 (identified individually as "NMDs" 103a-102i), and controller devices 104a and 104b (collectively "controller devices 104"). Referring to FIG. 1B, the home environment may include additional and/or other computing devices, including local network devices, such as one or more smart illumination devices 108 (FIG. 1B), a smart thermostat 110, and a local computing device 105 (FIG. 1A). In embodiments described below, one or more of the various playback devices 102 may be configured as portable playback devices, while others may be configured as stationary playback devices. For example, the headphones 102o (FIG. 1B) are a portable playback device, while the playback device 102d on the bookcase may be a stationary device. As another example, the playback device 102c on the Patio may be a battery-powered device, which may allow it to be transported to various areas within the environment 101, and outside of the environment 101, when it is not plugged in to a wall outlet or the like.

With reference still to FIG. 1B, the various playback, network microphone, and controller devices 102, 103, and 104 and/or other network devices of the MPS 100 may be coupled to one another via point-to-point connections and/or over other connections, which may be wired and/or wireless, via a network 111, such as a local area network (LAN) which may include a network router 109. As used herein, a local area network can include any communications technology that is not configured for wide area communications, for example, WiFi, Bluetooth, Digital Enhanced Cordless Telecommunications (DECT), Ultra-WideB and, etc. For example, the playback device 102j in the Den 101d (FIG. 1A), which may be designated as the "Left" device, may have a point-to-point connection with the playback device 102a, which is also in the Den 101d and may be designated as the "Right" device. In a related embodiment, the Left playback device 102j may communicate with other network devices, such as the playback device 102b, which may be designated as the "Front" device, via a point-to-point connection and/or other connections via the NETWORK 111.

As further shown in FIG. 1B, the MPS 100 may be coupled to one or more remote computing devices 106 via a wide area network ("WAN") 107. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the home environment 101.

In some implementations, the various playback devices, NMDs, and/or controller devices 102-104 may be communicatively coupled to at least one remote computing device associated with a VAS and at least one remote computing device associated with a media content service ("MCS"). For instance, in the illustrated example of FIG. 1B, remote computing devices 106 are associated with a VAS 190 and remote computing devices 106b are associated with an MCS 192. Although only a single VAS 190 and a single MCS 192 are shown in the example of FIG. 1B for purposes of clarity, the MPS 100 may be coupled to multiple, different VASes and/or MCSes. In some implementations, VASes may be operated by one or more of AMAZON, GOOGLE, APPLE, MICROSOFT, SONOS or other voice assistant providers. In some implementations, MCSes may be operated by one or more of SPOTIFY, PANDORA, AMAZON MUSIC, or other media content services.

As further shown in FIG. 1B, the remote computing devices 106 further include remote computing device 106*c* configured to perform certain operations, such as remotely facilitating media playback functions, managing device and system status information, directing communications between the devices of the MPS 100 and one or multiple VASes and/or MCSes, among other operations. In one example, the remote computing devices 106*c* provide cloud servers for one or more SONOS Wireless HiFi Systems.

In various implementations, one or more of the playback devices 102 may take the form of or include an on-board (e.g., integrated) network microphone device. For example, the playback devices 102*a-e* include or are otherwise equipped with corresponding NMDs 103*a-e*, respectively. A playback device that includes or is equipped with an NMD may be referred to herein interchangeably as a playback device or an NMD unless indicated otherwise in the description. In some cases, one or more of the NMDs 103 may be a stand-alone device. For example, the NMDs 103*f* and 103*g* may be stand-alone devices. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 102 and 103 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 102*d* because it is physically situated on a bookcase. Similarly, the NMD 103*f* may be assigned the named "Island" because it is physically situated on an island countertop in the Kitchen 101*h* (FIG. 1A). Some playback devices may be assigned names according to a zone or room, such as the playback devices 102*e*, 102*l*, 102*m*, and 102*n*, which are named "Bedroom," "Dining Room," "Living Room," and "Office," respectively. Further, certain playback devices may have functionally descriptive names. For example, the playback devices 102*a* and 102*b* are assigned the names "Right" and "Front," respectively, because these two devices are configured to provide specific audio channels during media playback in the zone of the Den 101*d* (FIG. 1A). The playback device 102*c* in the Patio may be named portable because it is battery-powered and/or readily transportable to different areas of the environment 101. Other naming conventions are possible.

As discussed above, an NMD may detect and process sound from its environment, such as sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word associated with a particular VAS.

In the illustrated example of FIG. 1B, the NMDs 103 are configured to interact with the VAS 190 over a network via the network 111 and the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 102-105 (FIG. 1A) and/or remote computing devices 106*c* of the MPS 100 may exchange various feedback, information, instructions, and/or related data with the remote computing devices associated with the selected VAS. Such exchanges may be related to or independent of transmitted messages containing voice inputs. In some embodiments, the remote computing device(s) and the MPS 100 may exchange data via communication paths as described herein and/or using a metadata exchange channel as described in U.S. application Ser. No. 15/438,749 filed Feb. 21, 2017, and titled "Voice Control of a Media Playback System," which is herein incorporated by reference in its entirety.

Upon receiving the stream of sound data, the VAS 190 determines if there is voice input in the streamed data from the NMD, and if so the VAS 190 will also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude." After these determinations, the VAS 190 may transmit a command to a particular MCS 192 to retrieve content (i.e., the song "Hey Jude"), and that MCS 192, in turn, provides (e.g., streams) this content directly to the MPS 100 or indirectly via the VAS 190. In some implementations, the VAS 190 may transmit to the MPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 102*d* in the environment 101 (FIG. 1A) is in relatively close proximity to the NMD-equipped Living Room playback device 102*m*, and both devices 102*d* and 102*m* may at least sometimes detect the same sound. In such cases, this may require arbitration as to which device is ultimately responsible for providing detected-sound data to the remote VAS. Examples of arbitrating between NMDs may be found, for example, in previously referenced U.S. application Ser. No. 15/438,749. When performing local command-keyword detection, as described in more detail below, it may be useful to forego or delay any such arbitration, such that two or more NMDs may process the same voice input for command-keyword detection. This can allow results of voice processing of two or more different NMDS to be compared to one another as a way to cross-check keyword detection results. In some embodiments, results of keyword engine determinations associated with different NMDs can be used to arbitrate between them. For example, if a first keyword engine associated with a first NMD identifies a keyword with a higher confidence level than that of a second keyword engine associated with the second NMD, then the first NMD may be selected over the second NMD.

In certain implementations, an NMD may be assigned to, or otherwise associated with, a designated or default playback device that may not include an NMD. For example, the Island NMD 103*f* in the Kitchen 101*h* (FIG. 1A) may be assigned to the Dining Room playback device 102*l*, which is in relatively close proximity to the Island NMD 103*f*. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. Patent Application No.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback, network microphone, and/or controller devices 102-104. For example, the technologies herein may be utilized within an environment having a single playback device 102 and/or a single NMD 103. In some examples of such cases, the NETWORK 111 (FIG. 1B) may be eliminated and the single playback device 102 and/or the single NMD 103 may communicate directly with the remote computing devices 106-*d*. In some embodiments, a telecommunication network (e.g., an LTE network, a 5G network, etc.) may communicate with the various playback, network microphone, and/or controller devices 102-104 independent of a LAN.

a. Example Playback & Network Microphone Devices

Figure 2A:
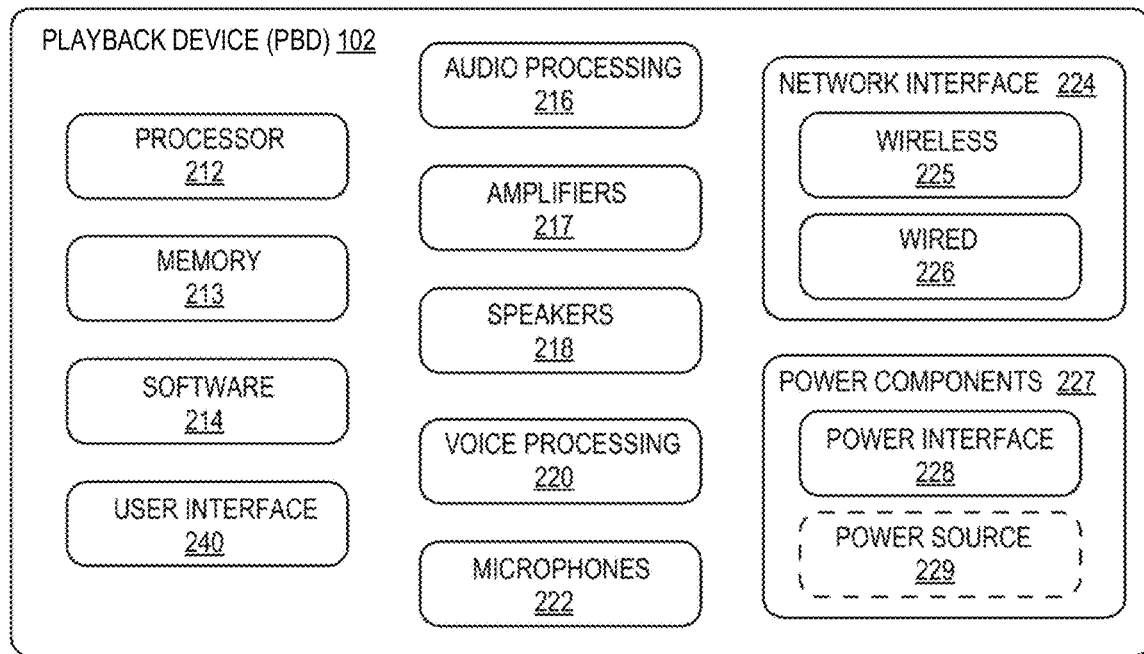
FIG. 2A is a functional block diagram of an example playback device.

FIG. 2A is a functional block diagram illustrating certain aspects of one of the playback devices 102 of the MPS 100 of FIGS. 1A and 1B. As shown, the playback device 102 includes various components, each of which is discussed in further detail below, and the various components of the playback device 102 may be operably coupled to one another via a system bus, communication network, or some other connection mechanism. In the illustrated example of FIG. 2A, the playback device 102 may be referred to as an "NMD-equipped" playback device because it includes components that support the functionality of an NMD, such as one of the NMDs 103 shown in FIG. 1A.

As shown, the playback device 102 includes at least one processor 212, which may be a clock-driven computing component configured to process input data according to instructions stored in memory 213. The memory 213 may be a tangible, non-transitory, computer-readable medium configured to store instructions that are executable by the processor 212. For example, the memory 213 may be data storage that can be loaded with software code 214 that is executable by the processor 212 to achieve certain functions. In some embodiments, the memory 213 can include both permanent memory (e.g., flash memory) and non-permanent memory (e.g., DRAM).

In one example, these functions may involve the playback device 102 retrieving audio data from an audio source, which may be another playback device. In another example, the functions may involve the playback device 102 sending audio data, detected-sound data (e.g., corresponding to a voice input), and/or other information to another device on a network via at least one network interface 224. In yet another example, the functions may involve the playback device 102 causing one or more other playback devices to synchronously playback audio with the playback device 102. In yet a further example, the functions may involve the playback device 102 facilitating being paired or otherwise bonded with one or more other playback devices to create a multi-channel audio environment. Numerous other example functions are possible, some of which are discussed below.

As just mentioned, certain functions may involve the playback device 102 synchronizing playback of audio content with one or more other playback devices. During synchronous playback, a listener may not perceive time-delay differences between playback of the audio content by the synchronized playback devices. U.S. Pat. No. 8,234,395 filed on Apr. 4, 2004, and titled "System and method for synchronizing operations among a plurality of independently clocked digital data processing devices," which is hereby incorporated by reference in its entirety, provides in more detail some examples for audio playback synchronization among playback devices.

To facilitate audio playback, the playback device 102 includes audio processing components 216 that are generally configured to process audio prior to the playback device 102 rendering the audio. In this respect, the audio processing components 216 may include one or more digital-to-analog converters ("DAC"), one or more audio preprocessing components, one or more audio enhancement components, one or more digital signal processors ("DSPs"), and so on. In some implementations, one or more of the audio processing components 216 may be a subcomponent of the processor 212. In operation, the audio processing components 216 receive analog and/or digital audio and process and/or otherwise intentionally alter the audio to produce audio signals for playback.

The produced audio signals may then be provided to one or more audio amplifiers 217 for amplification and playback through one or more speakers 218 operably coupled to the amplifiers 217. The audio amplifiers 217 may include components configured to amplify audio signals to a level for driving one or more of the speakers 218.

Each of the speakers 218 may include an individual transducer (e.g., a "driver") or the speakers 218 may include a complete speaker system involving an enclosure with one or more drivers. A particular driver of a speaker 218 may include, for example, a subwoofer (e.g., for low frequencies), a mid-range driver (e.g., for middle frequencies), and/or a tweeter (e.g., for high frequencies). In some cases, a transducer may be driven by an individual corresponding audio amplifier of the audio amplifiers 217. In some implementations, a playback device may not include the speakers 218, but instead may include a speaker interface for connecting the playback device to external speakers. In certain embodiments, a playback device may include neither the speakers 218 nor the audio amplifiers 217, but instead may include an audio interface (not shown) for connecting the playback device to an external audio amplifier or audio-visual receiver.

In addition to producing audio signals for playback by the playback device 102, the audio processing components 216 may be configured to process audio to be sent to one or more other playback devices, via the network interface 224, for playback. In example scenarios, audio content to be processed and/or played back by the playback device 102 may be received from an external source, such as via an audio line-in interface (e.g., an auto-detecting 3.5 mm audio line-in connection) of the playback device 102 (not shown) or via the network interface 224, as described below.

As shown, the at least one network interface 224, may take the form of one or more wireless interfaces 225 and/or one or more wired interfaces 226. A wireless interface may provide network interface functions for the playback device 102 to wirelessly communicate with other devices (e.g., other playback device(s), NMD(s), and/or controller device (s)) in accordance with a communication protocol (e.g., any wireless standard including IEEE 802.11a, 802.11b, 802.11g, 802.11n, 802.11ac, 802.15, 4G mobile communication standard, and so on). A wired interface may provide network interface functions for the playback device 102 to communicate over a wired connection with other devices in accordance with a communication protocol (e.g., IEEE 802.3). While the network interface 224 shown in FIG. 2A include both wired and wireless interfaces, the playback device 102 may in some implementations include only wireless interface(s) or only wired interface(s).

In general, the network interface 224 facilitates data flow between the playback device 102 and one or more other devices on a data network. For instance, the playback device 102 may be configured to receive audio content over the data network from one or more other playback devices, network devices within a LAN, and/or audio content sources over a WAN, such as the Internet. In one example, the audio content and other signals transmitted and received by the playback device 102 may be transmitted in the form of digital packet data comprising an Internet Protocol (IP)-based source address and IP-based destination addresses. In such a case, the network interface 224 may be configured to parse the digital packet data such that the data destined for the playback device 102 is properly received and processed by the playback device 102.

As shown in FIG. 2A, the playback device 102 also includes voice processing components 220 that are operably coupled to one or more microphones 222. The microphones 222 are configured to detect sound (i.e., acoustic waves) in the environment of the playback device 102, which is then provided to the voice processing components 220. More specifically, each microphone 222 is configured to detect sound and convert the sound into a digital or analog signal representative of the detected sound, which can then cause the voice processing component 220 to perform various functions based on the detected sound, as described in greater detail below. In one implementation, the microphones 222 are arranged as an array of microphones (e.g., an array of six microphones). In some implementations, the playback device 102 includes more than six microphones (e.g., eight microphones or twelve microphones) or fewer than six microphones (e.g., four microphones, two microphones, or a single microphones).

In operation, the voice-processing components 220 are generally configured to detect and process sound received via the microphones 222, identify potential voice input in the detected sound, and extract detected-sound data to enable a VAS, such as the VAS 190 (FIG. 1B), to process voice input identified in the detected-sound data. The voice processing components 220 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 220 may include or otherwise take the form of one or more DSPs or one or more modules of a DSP. In this respect, certain voice processing components 220 may be configured with particular parameters (e.g., gain and/or spectral parameters) that may be modified or otherwise tuned to achieve particular functions. In some implementations, one or more of the voice processing components 220 may be a subcomponent of the processor 212.

As further shown in FIG. 2A, the playback device 102 also includes power components 227. The power components 227 include at least an external power source interface 228, which may be coupled to a power source (not shown) via a power cable or the like that physically connects the playback device 102 to an electrical outlet or some other external power source. Other power components may include, for example, transformers, converters, and like components configured to format electrical power.

In some implementations, the power components 227 of the playback device 102 may additionally include an internal power source 229 (e.g., one or more batteries) configured to power the playback device 102 without a physical connection to an external power source. When equipped with the internal power source 229, the playback device 102 may operate independent of an external power source. In some such implementations, the external power source interface 228 may be configured to facilitate charging the internal power source 229. As discussed before, a playback device comprising an internal power source may be referred to herein as a "portable playback device." On the other hand, a playback device that operates using an external power source may be referred to herein as a "stationary playback device," although such a device may in fact be moved around a home or other environment.

The playback device 102 further includes a user interface 240 that may facilitate user interactions independent of or in conjunction with user interactions facilitated by one or more of the controller devices 104. In various embodiments, the user interface 240 includes one or more physical buttons and/or supports graphical interfaces provided on touch sensitive screen(s) and/or surface(s), among other possibilities, for a user to directly provide input. The user interface 240 may further include one or more of lights (e.g., LEDs) and the speakers to provide visual and/or audio feedback to a user.

Figure 2B:
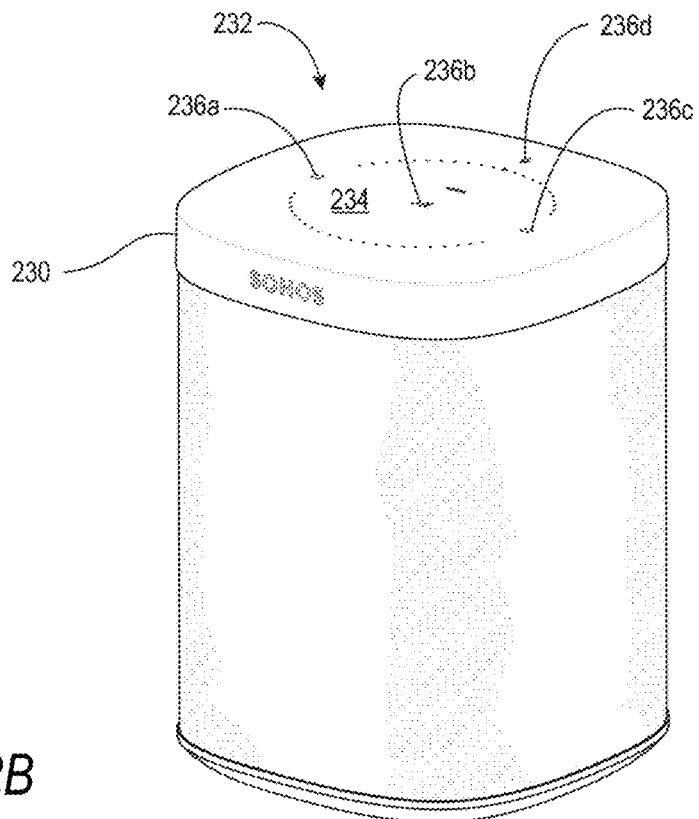
FIG. 2B is an isometric diagram of an example housing of the playback device of FIG. 2A.

As an illustrative example, FIG. 2B shows an example housing 230 of the playback device 102 that includes a user interface in the form of a control area 232 at a top portion 234 of the housing 230. The control area 232 includes buttons 236a-c for controlling audio playback, volume level, and other functions. The control area 232 also includes a button 236d for toggling the microphones 222 to either an on state or an off state.

As further shown in FIG. 2B, the control area 232 is at least partially surrounded by apertures formed in the top portion 234 of the housing 230 through which the microphones 222 (not visible in FIG. 2B) receive the sound in the environment of the playback device 102. The microphones 222 may be arranged in various positions along and/or within the top portion 234 or other areas of the housing 230 so as to detect sound from one or more directions relative to the playback device 102.

By way of illustration, SONOS, Inc. presently offers (or has offered) for sale certain playback devices that may implement certain of the embodiments disclosed herein, including a "PLAY:1," "PLAY:3," "PLAY:5," "PLAYBAR," "CONNECT:AMP," "PLAYBASE," "BEAM," "CONNECT," and "SUB." Any other past, present, and/or future playback devices may additionally or alternatively be used to implement the playback devices of example embodiments disclosed herein. Additionally, it should be understood that a playback device is not limited to the examples illustrated in FIGS. 2A or 2B or to the SONOS product offerings. For example, a playback device may include, or otherwise take the form of, a wired or wireless headphone set, which may operate as a part of the MPS 100 via a network interface or the like. In another example, a playback device may include or interact with a docking station for personal mobile media playback devices. In yet another example, a playback device may be integral to another device or component such as a television, a lighting fixture, or some other device for indoor or outdoor use.

Figure 2C:
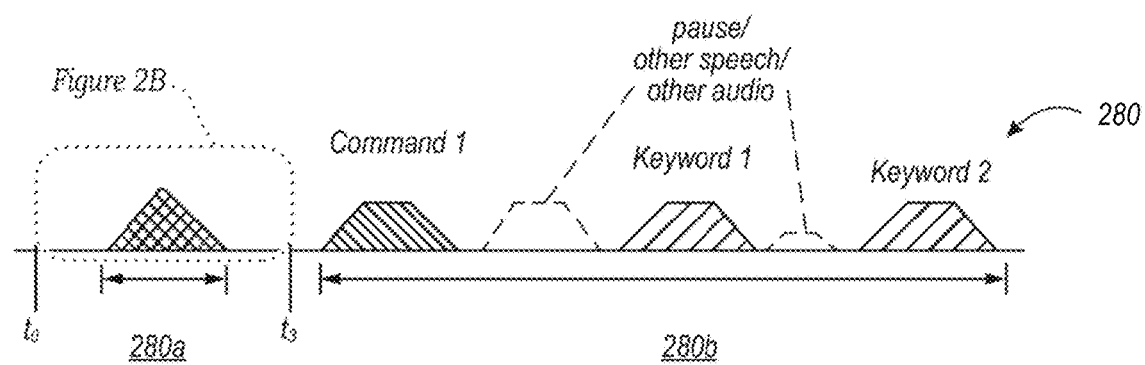
FIG. 2C is a diagram of an example voice input.

FIG. 2C is a diagram of an example voice input 280 that may be processed by an NMD or an NMD-equipped playback device. The voice input 280 may include a keyword portion 280a and an utterance portion 280b. In some embodiments, the voice input can include a command keyword, as described elsewhere herein, rather than a separate keyword portion and utterance portion. The keyword portion 280a may include a wake word or a command keyword. In the case of a wake word, the keyword portion 280a corresponds to detected sound that caused a command-keyword event. The utterance portion 280b corresponds to detected sound that potentially comprises a user request following the keyword portion 280a. An utterance portion 280b can be processed to identify the presence of any words in detected-sound data by the NMD in response to the event caused by the keyword portion 280a. In various implementations, an underlying intent can be determined based on the words in the utterance portion 280b. In certain implementations, an underlying intent can also be based or at least partially based on certain words in the keyword portion 280a, such as when keyword portion includes a command keyword. In any case, the words may correspond to one or more commands, as well as a certain command and certain keywords. A keyword in the voice utterance portion 280b may be, for example, a word identifying a particular device or group in the MPS 100. For instance, in the illustrated example, the keywords in the voice utterance portion 280b may be one or more words identifying one or more zones in which the music is to be played, such as the Living Room and the Dining Room (FIG. 1A). In some cases, the utterance portion 280b may include additional information, such as detected pauses (e.g., periods of non-speech) between words spoken by a user, as shown in FIG. 2C. The pauses may demarcate the locations of separate commands, keywords, or other information spoke by the user within the utterance portion 280b.

Based on certain command criteria, the NMD and/or a remote VAS may take actions as a result of identifying one or more commands in the voice input. Command criteria may be based on the inclusion of certain keywords within the voice input, among other possibilities. Additionally, or alternatively, command criteria for commands may involve identification of one or more control-state and/or zone-state variables in conjunction with identification of one or more particular commands. Control-state variables may include, for example, indicators identifying a level of volume, a queue associated with one or more devices, and playback state, such as whether devices are playing a queue, paused, etc. Zone-state variables may include, for example, indicators identifying which, if any, zone players are grouped.

In some implementations, the MPS 100 is configured to temporarily reduce the volume of audio content that it is playing upon detecting a certain keyword, such as a wake word, in the keyword portion 280a. The MPS 100 may restore the volume after processing the voice input 280. Such a process can be referred to as ducking, examples of which are disclosed in U.S. patent application Ser. No. 15/438,749, incorporated by reference herein in its entirety.

Figure 2D:
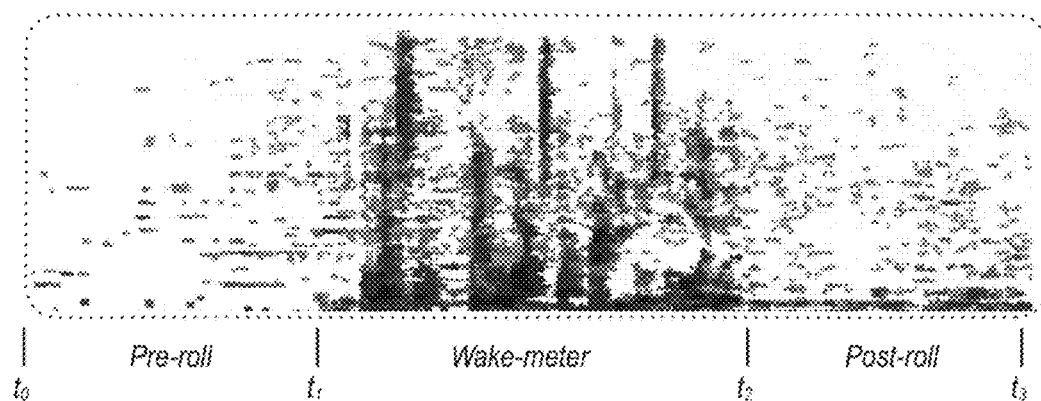
FIG. 2D is a graph depicting an example sound specimen in accordance with aspects of the disclosure.

FIG. 2D shows an example sound specimen. In this example, the sound specimen corresponds to the sound-data stream (e.g., one or more audio frames) associated with a spotted wake word or command keyword in the keyword portion 280a of FIG. 2A. As illustrated, the example sound specimen comprises sound detected in an NMD's environment (i) immediately before a wake or command word was spoken, which may be referred to as a pre-roll portion (between times $t_0$ and $t_1$), (ii) while a wake or command word was spoken, which may be referred to as a wake-meter portion (between times $t_1$ and $t_2$), and/or (iii) after the wake or command word was spoken, which may be referred to as a post-roll portion (between times $t_2$ and $t_3$). Other sound specimens are also possible. In various implementations, aspects of the sound specimen can be evaluated according to an acoustic model which aims to map mels/spectral features to phonemes in a given language model for further processing. For example, automatic speech recognition (ASR) may include such mapping for keyword detection. Wake-word detection engines, by contrast, may be precisely tuned to identify a specific wake-word, and a downstream action of invoking a VAS (e.g., by targeting only nonce words in the voice input processed by the playback device).

ASR for command keyword detection may be tuned to accommodate a wide range of keywords (e.g., 5, 10, 100, 1,000, 10,000 keywords). Command-keyword detection, in contrast to wake-word detection, may involve feeding ASR output to an onboard, local NLU which together with the ASR determine when command-keyword events have occurred. In some implementations described below, the local NLU may determine an intent based on one or more other keywords in the ASR output produced by a particular voice input. In these or other implementations, a playback device may act on a detected command-keyword event only when the playback devices determines that certain conditions have been met, such as environmental conditions (e.g., low background noise). In some embodiments, multiple devices within a single media playback system may have different onboard, local ASRs and/or NLUs, for example supporting different libraries of keywords.

b. Example Playback Device Configurations

FIGS. 3A-3E show example configurations of playback devices. Referring first to FIG. 3A, in some example instances, a single playback device may belong to a zone. For example, the playback device 102c (FIG. 1A) on the Patio may belong to Zone A. In some implementations described below, multiple playback devices may be "bonded" to form a "bonded pair," which together form a single zone. For example, the playback device 102f (FIG. 1A) named "Bed 1" in FIG. 3A may be bonded to the playback device 102g (FIG. 1A) named "Bed 2" in FIG. 3A to form Zone B. Bonded playback devices may have different playback responsibilities (e.g., channel responsibilities). In another implementation described below, multiple playback devices may be merged to form a single zone. For example, the playback device 102d named "Bookcase" may be merged with the playback device 102m named "Living Room" to form a single Zone C. The merged playback devices 102d and 102m may not be specifically assigned different playback responsibilities. That is, the merged playback devices 102d and 102m may, aside from playing audio content in synchrony, each play audio content as they would if they were not merged.

For purposes of control, each zone in the MPS 100 may be represented as a single user interface ("UI") entity. For example, as displayed by the controller devices 104, Zone A may be provided as a single entity named "Portable," Zone B may be provided as a single entity named "Stereo," and Zone C may be provided as a single entity named "Living Room."

In various embodiments, a zone may take on the name of one of the playback devices belonging to the zone. For example, Zone C may take on the name of the Living Room device 102m (as shown). In another example, Zone C may instead take on the name of the Bookcase device 102d. In a further example, Zone C may take on a name that is some combination of the Bookcase device 102d and Living Room device 102m. The name that is chosen may be selected by a user via inputs at a controller device 104. In some embodiments, a zone may be given a name that is different than the device(s) belonging to the zone. For example, Zone B in FIG. 3A is named "Stereo" but none of the devices in Zone B have this name. In one aspect, Zone B is a single UI entity representing a single device named "Stereo," composed of constituent devices "Bed 1" and "Bed 2." In one implementation, the Bed 1 device may be playback device 102f in the master bedroom 101b (FIG. 1A) and the Bed 2 device may be the playback device 102g also in the master bedroom 101h (FIG. 1A).

As noted above, playback devices that are bonded may have different playback responsibilities, such as playback responsibilities for certain audio channels. For example, as shown in FIG. 3B, the Bed 1 and Bed 2 devices 102f and 102g may be bonded so as to produce or enhance a stereo effect of audio content. In this example, the Bed 1 playback device 102f may be configured to play a left channel audio component, while the Bed 2 playback device 102g may be configured to play a right channel audio component. In some implementations, such stereo bonding may be referred to as "pairing."

Additionally, playback devices that are configured to be bonded may have additional and/or different respective speaker drivers. As shown in FIG. 3C, the playback device 102b named "Front" may be bonded with the playback device 102k named "SUB." The Front device 102b may render a range of mid to high frequencies, and the SUB device 102k may render low frequencies as, for example, a subwoofer. When unbonded, the Front device 102b may be configured to render a full range of frequencies. As another example, FIG. 3D shows the Front and SUB devices 102b and 102k further bonded with Right and Left playback devices 102a and 102j, respectively. In some implementations, the Right and Left devices 102a and 102j may form surround or "satellite" channels of a home theater system. The bonded playback devices 102a, 102b, 102j, and 102k may form a single Zone D (FIG. 3A).

In some implementations, playback devices may also be "merged." In contrast to certain bonded playback devices, playback devices that are merged may not have assigned playback responsibilities, but may each render the full range of audio content that each respective playback device is capable of. Nevertheless, merged devices may be represented as a single UI entity (i.e., a zone, as discussed above). For instance, FIG. 3E shows the playback devices 102d and 102m in the Living Room merged, which would result in these devices being represented by the single UI entity of Zone C. In one embodiment, the playback devices 102d and 102m may playback audio in synchrony, during which each outputs the full range of audio content that each respective playback device 102d and 102m is capable of rendering.

In some embodiments, a stand-alone NMD may be in a zone by itself. For example, the NMD 103h from FIG. 1A is named "Closet" and forms Zone I in FIG. 3A. An NMD may also be bonded or merged with another device so as to form a zone. For example, the NMD 103f named "Island" may be bonded with the playback device 102i Kitchen, which together form Zone F, which is also named "Kitchen." Additional details regarding assigning NMDs and playback devices as designated or default devices may be found, for example, in previously referenced U.S. patent application Ser. No. 15/438,749. In some embodiments, a stand-alone NMD may not be assigned to a zone.

Zones of individual, bonded, and/or merged devices may be arranged to form a set of playback devices that playback audio in synchrony. Such a set of playback devices may be referred to as a "group," "zone group," "synchrony group," or "playback group." In response to inputs provided via a controller device 104, playback devices may be dynamically grouped and ungrouped to form new or different groups that synchronously play back audio content. For example, referring to FIG. 3A, Zone A may be grouped with Zone B to form a zone group that includes the playback devices of the two zones. As another example, Zone A may be grouped with one or more other Zones C-I. The Zones A- I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Grouped and bonded devices are example types of associations between portable and stationary playback devices that may be caused in response to a trigger event, as discussed above and described in greater detail below.

In various implementations, the zones in an environment may be assigned a particular name, which may be the default name of a zone within a zone group or a combination of the names of the zones within a zone group, such as "Dining Room +Kitchen," as shown in FIG. 3A. In some embodiments, a zone group may be given a unique name selected by a user, such as "Nick's Room," as also shown in FIG. 3A. The name "Nick's Room" may be a name chosen by a user over a prior name for the zone group, such as the room name "Master Bedroom."

Referring back to FIG. 2A, certain data may be stored in the memory 213 as one or more state variables that are periodically updated and used to describe the state of a playback zone, the playback device(s), and/or a zone group associated therewith. The memory 213 may also include the data associated with the state of the other devices of the MPS 100, which may be shared from time to time among the devices so that one or more of the devices have the most recent data associated with the system.

In some embodiments, the memory 213 of the playback device 102 may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, in FIG. 1A, identifiers associated with the Patio may indicate that the Patio is the only playback device of a particular zone and not in a zone group. Identifiers associated with the Living Room may indicate that the Living Room is not grouped with other zones but includes bonded playback devices 102*a*, 102*b*, 102*j*, and 102*k*. Identifiers associated with the Dining Room may indicate that the Dining Room is part of Dining Room +Kitchen group and that devices 103*f* and 102*i* are bonded. Identifiers associated with the Kitchen may indicate the same or similar information by virtue of the Kitchen being part of the Dining Room +Kitchen zone group. Other example zone variables and identifiers are described below.

In yet another example, the MPS 100 may include variables or identifiers representing other associations of zones and zone groups, such as identifiers associated with Areas, as shown in FIG. 3A. An Area may involve a cluster of zone groups and/or zones not within a zone group. For instance, FIG. 3A shows a first area named "First Area" and a second area named "Second Area." The First Area includes zones and zone groups of the Patio, Den, Dining Room, Kitchen, and Bathroom. The Second Area includes zones and zone groups of the Bathroom, Nick's Room, Bedroom, and Living Room. In one aspect, an Area may be used to invoke a cluster of zone groups and/or zones that share one or more zones and/or zone groups of another cluster. In this respect, such an Area differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the MPS 100 may not implement Areas, in which case the system may not store variables associated with Areas.

The memory 213 may be further configured to store other data. Such data may pertain to audio sources accessible by the playback device 102 or a playback queue that the playback device (or some other playback device(s)) may be associated with. In embodiments described below, the memory 213 is configured to store a set of command data for selecting a particular VAS when processing voice inputs. During operation, one or more playback zones in the environment of FIG. 1A may each be playing different audio content. For instance, the user may be grilling in the Patio zone and listening to hip hop music being played by the playback device 102*c*, while another user may be preparing food in the Kitchen zone and listening to classical music being played by the playback device 102*i*. In another example, a playback zone may play the same audio content in synchrony with another playback zone.

For instance, the user may be in the Office zone where the playback device 102*n* is playing the same hip-hop music that is being playing by playback device 102*c* in the Patio zone. In such a case, playback devices 102*c* and 102*n* may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the MPS 100 may be dynamically modified. As such, the MPS 100 may support numerous configurations. For example, if a user physically moves one or more playback devices to or from a zone, the MPS 100 may be reconfigured to accommodate the change(s). For instance, if the user physically moves the playback device 102*c* from the Patio zone to the Office zone, the Office zone may now include both the playback devices 102*c* and 102*n*. In some cases, the user may pair or group the moved playback device 102*c* with the Office zone and/or rename the players in the Office zone using, for example, one of the controller devices 104 and/or voice input. As another example, if one or more playback devices 102 are moved to a particular space in the home environment that is not already a playback zone, the moved playback device(s) may be renamed or associated with a playback zone for the particular space.

Further, different playback zones of the MPS 100 may be dynamically combined into zone groups or split up into individual playback zones. For example, the Dining Room zone and the Kitchen zone may be combined into a zone group for a dinner party such that playback devices 102*i* and 102*l* may render audio content in synchrony. As another example, bonded playback devices in the Den zone may be split into (i) a television zone and (ii) a separate listening zone. The television zone may include the Front playback device 102*b*. The listening zone may include the Right, Left, and SUB playback devices 102*a*, 102*j*, and 102*k*, which may be grouped, paired, or merged, as described above. Splitting the Den zone in such a manner may allow one user to listen to music in the listening zone in one area of the living room space, and another user to watch the television in another area of the living room space. In a related example, a user may utilize either of the NMD 103*a* or 103*b* (FIG. 1B) to control the Den zone before it is separated into the television zone and the listening zone. Once separated, the listening zone may be controlled, for example, by a user in the vicinity of the NMD 103*a*, and the television zone may be controlled, for example, by a user in the vicinity of the NMD 103*b*. As described above, however, any of the NMDs 103 may be configured to control the various playback and other devices of the MPS 100.

c. Example Controller Devices

FIG. 4 is a functional block diagram illustrating certain aspects of a selected one of the controller devices 104 of the MPS 100 of FIG. 1A. Such controller devices may also be referred to herein as a "control device" or "controller." The controller device shown in FIG. 4 may include components that are generally similar to certain components of the network devices described above, such as a processor 412, memory 413 storing program software 414, at least one network interface 424, and one or more microphones 422. In one example, a controller device may be a dedicated controller for the MPS 100. In another example, a controller device may be a network device on which media playback system controller application software may be installed, such as for example, an iPhone™, iPad™ or any other smart phone, tablet, or network device (e.g., a networked computer such as a PC or Mac™)

The memory 413 of the controller device 104 may be configured to store controller application software and other data associated with the MPS 100 and/or a user of the system 100. The memory 413 may be loaded with instructions in software 414 that are executable by the processor 412 to achieve certain functions, such as facilitating user access, control, and/or configuration of the MPS 100. The controller device 104 is configured to communicate with other network devices via the network interface 424, which may take the form of a wireless interface, as described above.

In one example, system information (e.g., such as a state variable) may be communicated between the controller device 104 and other devices via the network interface 424. For instance, the controller device 104 may receive playback zone and zone group configurations in the MPS 100 from a playback device, an NMD, or another network device. Likewise, the controller device 104 may transmit such system information to a playback device or another network device via the network interface 424. In some cases, the other network device may be another controller device.

The controller device 104 may also communicate playback device control commands, such as volume control and audio playback control, to a playback device via the network interface 424. As suggested above, changes to configurations of the MPS 100 may also be performed by a user using the controller device 104. The configuration changes may include adding/removing one or more playback devices to/from a zone, adding/removing one or more zones to/from a zone group, forming a bonded or merged player, separating one or more playback devices from a bonded or merged player, among others.

As shown in FIG. 4, the controller device 104 also includes a user interface 440 that is generally configured to facilitate user access and control of the MPS 100. The user interface 440 may include a touch-screen display or other physical interface configured to provide various graphical controller interfaces, such as the controller interfaces 540*a* and 540*b* shown in FIGS. 5A and 5B. Referring to FIGS. 5A and 5B together, the controller interfaces 540*a* and 540*b* includes a playback control region 542, a playback zone region 543, a playback status region 544, a playback queue region 546, and a sources region 548. The user interface as shown is just one example of an interface that may be provided on a network device, such as the controller device shown in FIG. 4, and accessed by users to control a media playback system, such as the MPS 100. Other user interfaces of varying formats, styles, and interactive sequences may alternatively be implemented on one or more network devices to provide comparable control access to a media playback system.

The playback control region 542 (FIG. 5A) may include selectable icons (e.g., by way of touch or by using a cursor) that, when selected, cause playback devices in a selected playback zone or zone group to play or pause, fast forward, rewind, skip to next, skip to previous, enter/exit shuffle mode, enter/exit repeat mode, enter/exit cross fade mode, etc. The playback control region 542 may also include selectable icons that, when selected, modify equalization settings and/or playback volume, among other possibilities.

The playback zone region 543 (FIG. 5B) may include representations of playback zones within the MPS 100. The playback zones regions 543 may also include a representation of zone groups, such as the Dining Room +Kitchen zone group, as shown.

In some embodiments, the graphical representations of playback zones may be selectable to bring up additional selectable icons to manage or configure the playback zones in the MPS 100, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the MPS 100 to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface are also possible. The representations of playback zones in the playback zone region 543 (FIG. 5B) may be dynamically updated as playback zone or zone group configurations are modified.

The playback status region 544 (FIG. 5A) may include graphical representations of audio content that is presently being played, previously played, or scheduled to play next in the selected playback zone or zone group. The selected playback zone or zone group may be visually distinguished on a controller interface, such as within the playback zone region 543 and/or the playback status region 544. The graphical representations may include track title, artist name, album name, album year, track length, and/or other relevant information that may be useful for the user to know when controlling the MPS 100 via a controller interface.

The playback queue region 546 may include graphical representations of audio content in a playback queue associated with the selected playback zone or zone group. In some embodiments, each playback zone or zone group may be associated with a playback queue comprising information corresponding to zero or more audio items for playback by the playback zone or zone group. For instance, each audio item in the playback queue may comprise a uniform resource identifier (URI), a uniform resource locator (URL), or some other identifier that may be used by a playback device in the playback zone or zone group to find and/or retrieve the audio item from a local audio content source or a networked audio content source, which may then be played back by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streamed audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue or may be associated with a new playback queue that is empty or contains audio items from the playback queue associated with the established zone group before the established zone group was ungrouped. Similarly, the resulting second playback zone may be re-associated with the previous second playback queue or may be associated with a new playback queue that is empty or contains audio items from the playback queue associated with the established zone group before the established zone group was ungrouped. Other examples are also possible.

With reference still to FIGS. 5A and 5B, the graphical representations of audio content in the playback queue region 646 (FIG. 5A) may include track titles, artist names, track lengths, and/or other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 548 may include graphical representations of selectable audio content sources and/or selectable voice assistants associated with a corresponding VAS. The VASes may be selectively assigned. In some examples, multiple VASes, such as AMAZON' s Alexa, MICROSOFT's Cortana, etc., may be invokable by the same NMD. In some embodiments, a user may assign a VAS exclusively to one or more NMDs. For example, a user may assign a first VAS to one or both of the playback devices 102a and 102b in the Living Room shown in FIG. 1A, and a second VAS to the NMD 103f in the Kitchen. Other examples are possible.

d. Example Audio Content Sources

The audio sources in the sources region 548 may be audio content sources from which audio content may be retrieved and played by the selected playback zone or zone group. One or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., via a line-in connection). In another example, audio content may be provided to a playback device over a network via one or more other playback devices or network devices. As described in greater detail below, in some embodiments, audio content may be provided by one or more media content services.

Example audio content sources may include a memory of one or more playback devices in a media playback system such as the MPS 100 of FIG. 1, local music libraries on one or more network devices (e.g., a controller device, a network-enabled personal computer, or a networked-attached storage ("NAS")), streaming audio services providing audio content via the Internet (e.g., cloud-based music services), or audio sources connected to the media playback system via a line-in input connection on a playback device or network device, among other possibilities.

In some embodiments, audio content sources may be added or removed from a media playback system such as the MPS 100 of FIG. 1A. In one example, an indexing of audio items may be performed whenever one or more audio content sources are added, removed, or updated. Indexing of audio items may involve scanning for identifiable audio items in all folders/directories shared over a network accessible by playback devices in the media playback system and generating or updating an audio content database comprising metadata (e.g., title, artist, album, track length, among others) and other associated information, such as a URI or URL for each identifiable audio item found. Other examples for managing and maintaining audio content sources may also be possible.

FIG. 6 is a message flow diagram illustrating data exchanges between devices of the MPS 100. At step 650a, the MPS 100 receives an indication of selected media content (e.g., one or more songs, albums, playlists, podcasts, videos, stations) via the control device 104. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 104 transmits a message 651a to the playback device 102 (FIGS. 1A-1C) to add the selected media content to a playback queue on the playback device 102.

At step 650b, the playback device 102 receives the message 651a and adds the selected media content to the playback queue for play back.

At step 650c, the control device 104 receives input corresponding to a command to play back the selected media content. In response to receiving the input corresponding to the command to play back the selected media content, the control device 104 transmits a message 651b to the playback device 102 causing the playback device 102 to play back the selected media content. In response to receiving the message 651b, the playback device 102 transmits a message 651c to the computing device 106 requesting the selected media content. The computing device 106, in response to receiving the message 651c, transmits a message 651d comprising data (e.g., audio data, video data, a URL, a URI) corresponding to the requested media content.

At step 650d, the playback device 102 receives the message 651d with the data corresponding to the requested media content and plays back the associated media content.

At step 650e, the playback device 102 optionally causes one or more other devices to play back the selected media content. In one example, the playback device 102 is one of a bonded zone of two or more players (FIG. 1M). The playback device 102 can receive the selected media content and transmit all or a portion of the media content to other devices in the bonded zone. In another example, the playback device 102 is a coordinator of a group and is configured to transmit and receive timing information from one or more other devices in the group. The other one or more devices in the group can receive the selected media content from the computing device 106, and begin playback of the selected media content in response to a message from the playback device 102 such that all of the devices in the group play back the selected media content in synchrony.

III. Example Local Keyword Engines

Figure 7A:
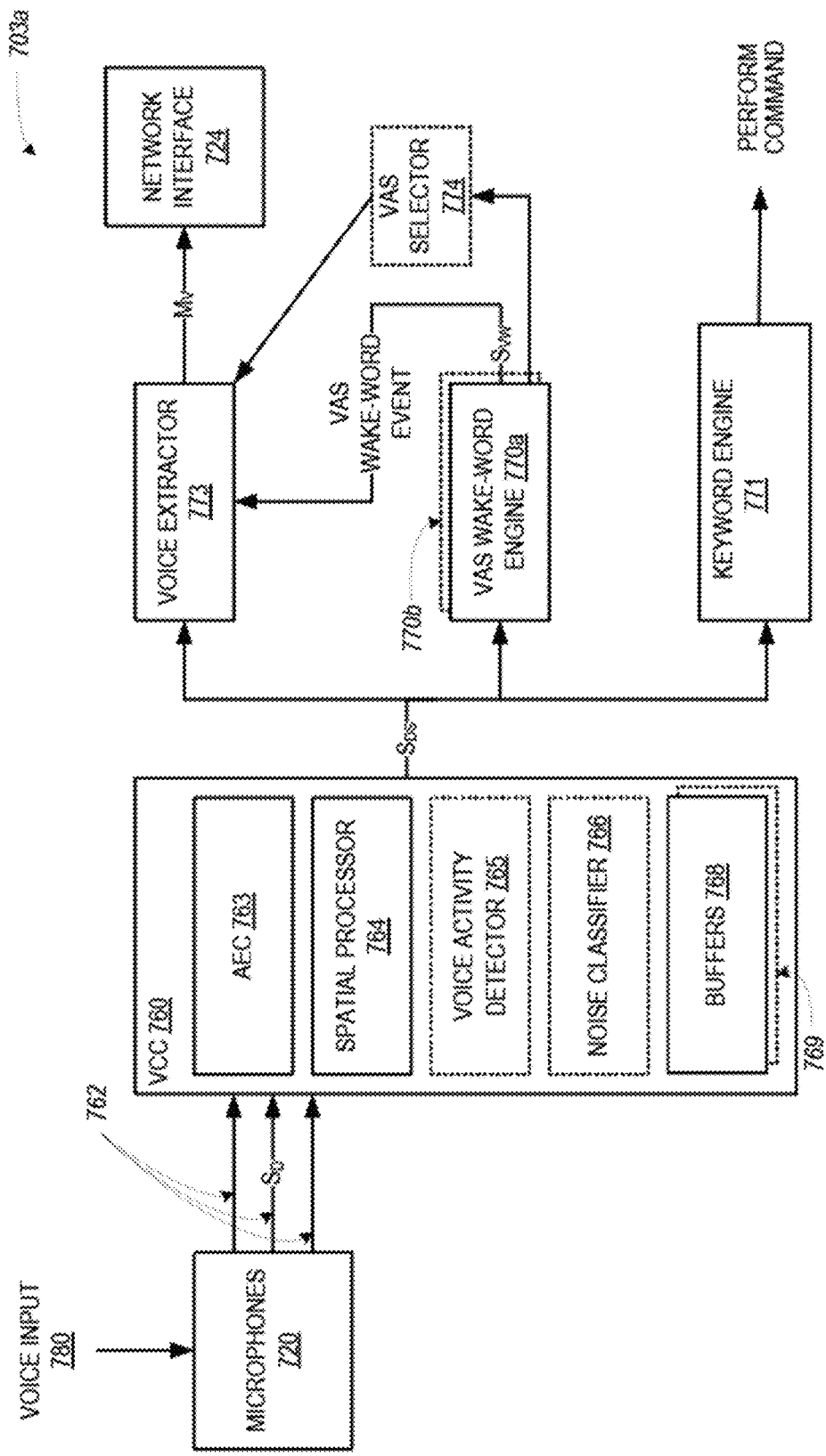
FIG. 7A is a functional block diagram of certain components of an example network microphone device in accordance with aspects of the disclosure.

FIG. 7A is functional block diagram showing aspects of an NMD 703 configured in accordance with embodiments of the disclosure. The NMD 703 may be generally similar to the NMD 103 and include similar components. As described in more detail below, the NMD 703 (FIG. 7A) is configured to handle certain voice inputs locally, without necessarily transmitting data representing the voice input to a voice assistant service. However, the NMD 703 is also configured to process other voice inputs using a voice assistant service.

Referring to FIG. 7A, the NMD 703 includes voice capture components ("VCC") 760, a VAS wake-word engine 770a, and a voice extractor 773. The VAS wake-word engine 770a and the voice extractor 773 are operably coupled to the VCC 760. The NMD 703 further comprises a keyword engine 771 operably coupled to the VCC 760.

The NMD 703 further includes microphones 720 and the at least one network interface 724 as described above and may also include other components, such as audio amplifiers, a user interface, etc., which are not shown in FIG. 7A for purposes of clarity. The microphones 720 of the NMD 703 are configured to provide detected sound, SD, from the environment of the NMD 703 to the VCC 760. The detected sound $S_D$ may take the form of one or more analog or digital signals. In example implementations, the detected sound $S_D$ may be composed of a plurality signals associated with respective channels 762 that are fed to the VCC 760.

Each channel 762 may correspond to a particular microphone 720. For example, an NMD having six microphones may have six corresponding channels. Each channel of the detected sound $S_D$ may bear certain similarities to the other channels but may differ in certain regards, which may be due to the position of the given channel's corresponding microphone relative to the microphones of other channels. For example, one or more of the channels of the detected sound $S_D$ may have a greater signal to noise ratio ("SNR") of speech to background noise than other channels.

As further shown in FIG. 7A, the VCC 760 includes an AEC 763, a spatial processor 764, and one or more buffers 768. In operation, the AEC 763 receives the detected sound $S_D$ and filters or otherwise processes the sound to suppress echoes and/or to otherwise improve the quality of the detected sound SD. That processed sound may then be passed to the spatial processor 764.

The spatial processor 764 is typically configured to analyze the detected sound $S_D$ and identify certain characteristics, such as a sound's amplitude (e.g., decibel level), frequency spectrum, directionality, etc. In one respect, the spatial processor 764 may help filter or suppress ambient noise in the detected sound $S_D$ from potential user speech based on similarities and differences in the constituent channels 762 of the detected sound $S_D$, as discussed above. As one possibility, the spatial processor 764 may monitor metrics that distinguish speech from other sounds. Such metrics can include, for example, energy within the speech band relative to background noise and entropy within the speech band—a measure of spectral structure—which is typically lower in speech than in most common background noise. In some implementations, the spatial processor 764 may be configured to determine a speech presence probability, examples of such functionality are disclosed in U.S. patent application Ser. No. 15/984,073, filed May 18, 2018, titled "Linear Filtering for Noise-Suppressed Speech Detection," which is incorporated herein by reference in its entirety.

In operation, the one or more buffers 768—one or more of which may be part of or separate from the memory 213 (FIG. 2A)—capture data corresponding to the detected sound $S_D$. More specifically, the one or more buffers 768 capture detected-sound data that was processed by the upstream AEC 764 and spatial processor 764.

The network interface 724 may then provide this information to a remote server that may be associated with the MPS 100. In one aspect, the information stored in the additional buffer 769 does not reveal the content of any speech but instead is indicative of certain unique features of the detected sound itself. In a related aspect, the information may be communicated between computing devices, such as the various computing devices of the MPS 100, without necessarily implicating privacy concerns. In practice, the MPS 100 can use this information to adapt and fine tune voice processing algorithms, including sensitivity tuning as discussed below. In some implementations the additional buffer may comprise or include functionality similar to lookback buffers disclosed, for example, in U.S. patent application Ser. No. 15/989,715, filed May 25, 2018, titled "Determining and Adapting to Changes in Microphone Performance of Playback Devices"; U.S. patent application Ser. No. 16/141,875, filed Sep. 25, 2018, titled "Voice Detection Optimization Based on Selected Voice Assistant Service"; and U.S. patent application Ser. No. 16/138,111, filed Sep. 21, 2018, titled "Voice Detection Optimization Using Sound Metadata," which are incorporated herein by reference in their entireties.

In any event, the detected-sound data forms a digital representation (i.e., sound-data stream), $S_{DS}$, of the sound detected by the microphones 720. In practice, the sound-data stream $S_{DS}$ may take a variety of forms. As one possibility, the sound-data stream $S_{DS}$ may be composed of frames, each of which may include one or more sound samples. The frames may be streamed (i.e., read out) from the one or more buffers 768 for further processing by downstream components, such as the VAS wake-word engines 770 and the voice extractor 773 of the NMD 703.

In some implementations, at least one buffer 768 captures detected-sound data utilizing a sliding window approach in which a given amount (i.e., a given window) of the most recently captured detected-sound data is retained in the at least one buffer 768 while older detected sound data is overwritten when it falls outside of the window. For example, at least one buffer 768 may temporarily retain 20 frames of a sound specimen at given time, discard the oldest frame after an expiration time, and then capture a new frame, which is added to the 19 prior frames of the sound specimen.

In practice, when the sound-data stream $S_{DS}$ is composed of frames, the frames may take a variety of forms having a variety of characteristics. As one possibility, the frames may take the form of audio frames that have a certain resolution (e.g., 16 bits of resolution), which may be based on a sampling rate (e.g., 44,100 Hz). Additionally, or alternatively, the frames may include information corresponding to a given sound specimen that the frames define, such as metadata that indicates frequency response, power input level, SNR, microphone channel identification, and/or other information of the given sound specimen, among other examples. Thus, in some embodiments, a frame may include a portion of sound (e.g., one or more samples of a given sound specimen) and metadata regarding the portion of sound. In other embodiments, a frame may only include a portion of sound (e.g., one or more samples of a given sound specimen) or metadata regarding a portion of sound.

In any case, downstream components of the NMD 703 may process the sound-data stream $S_{DS}$. For instance, the VAS wake-word engines 770 are configured to apply one or more identification algorithms to the sound-data stream $S_{DS}$ (e.g., streamed sound frames) to spot potential wake words in the detected-sound $S_D$. This process may be referred to as automatic speech recognition. The VAS wake-word engine 770a and keyword engine 771 apply different identification algorithms corresponding to their respective wake words, and further generate different events based on detecting a wake word in the detected sound $S_D$.

Example wake word detection algorithms accept audio as input and provide an indication of whether a wake word is present in the audio. Many first- and third-party wake word detection algorithms are known and commercially available. For instance, operators of a voice service may make their algorithm available for use in third-party devices. Alternatively, an algorithm may be trained to detect certain wake-words.

For instance, when the VAS wake-word engine 770a detects a potential VAS wake word, the VAS work-word engine 770a provides an indication of a "VAS wake-word event" (also referred to as a "VAS wake-word trigger"). In the illustrated example of FIG. 7A, the VAS wake word engine 770a outputs a signal, $S_{VW}$, that indicates the occurrence of a VAS wake-word event to the voice extractor 773.

In multi-VAS implementations, the NMD 703 may include a VAS selector 774 (shown in dashed lines) that is generally configured to direct extraction by the voice extractor 773 and transmission of the sound-data stream $S_{DS}$ to the appropriate VAS when a given wake-word is identified by a particular wake-word engine (and a corresponding wake-word trigger), such as the VAS wake-word engine 770a and at least one additional VAS wake-word engine 770b (shown in dashed lines). In such implementations, the NMD 703 may include multiple, different VAS wake word engines and/or voice extractors, each supported by a respective VAS.

Similar to the discussion above, each VAS wake-word engine 770 may be configured to receive as input the sound-data stream $S_{DS}$ from the one or more buffers 768 and apply identification algorithms to cause a wake-word trigger for the appropriate VAS. Thus, as one example, the VAS wake-word engine 770a may be configured to identify the wake word "Alexa" and cause the NMD 703 to invoke the AMAZON VAS when "Alexa" is spotted. As another example, the wake-word engine 770b may be configured to identify the wake word "Ok, Google" and cause the NMD 520 to invoke the GOOGLE VAS when "Ok, Google" is spotted. In single-VAS implementations, the VAS selector 774 may be omitted.

In response to the VAS wake-word event (e.g., in response to the signal Svw indicating the wake-word event), the voice extractor 773 is configured to receive and format (e.g., packetize) the sound-data stream $S_{DS}$. For instance, the voice extractor 773 packetizes the frames of the sound-data stream $S_{DS}$ into messages. The voice extractor 773 transmits or streams these messages, $M_V$, that may contain voice input in real time or near real time to a remote VAS via the network interface 724.

The VAS is configured to process the sound-data stream $S_{DS}$ contained in the messages Mv sent from the NMD 703. More specifically, the NMD 703 is configured to identify a voice input 780 based on the sound-data stream $S_{DS}$. As described in connection with FIG. 2C, the voice input 780 may include a keyword portion and an utterance portion. The keyword portion corresponds to detected sound that caused a wake-word event, or leads to a command-keyword event when one or more certain conditions, such as certain playback conditions, are met. For instance, when the voice input 780 includes a VAS wake word, the keyword portion corresponds to detected sound that caused the wake-word engine 770a to output the wake-word event signal SVW to the voice extractor 773. The utterance portion in this case corresponds to detected sound that potentially comprises a user request following the keyword portion.

When a VAS wake-word event occurs, the VAS may first process the keyword portion within the sound data stream $S_{DS}$ to verify the presence of a VAS wake word. In some instances, the VAS may determine that the keyword portion comprises a false wake word (e.g., the word "Election" when the word "Alexa" is the target VAS wake word). In such an occurrence, the VAS may send a response to the NMD 703 with an instruction for the NMD 703 to cease extraction of sound data, which causes the voice extractor 773 to cease further streaming of the detected-sound data to the VAS. The VAS wake-word engine 770a may resume or continue monitoring sound specimens until it spots another potential VAS wake word, leading to another VAS wake-word event. In some implementations, the VAS does not process or receive the keyword portion but instead processes only the utterance portion.

In any case, the VAS processes the utterance portion to identify the presence of any words in the detected-sound data and to determine an underlying intent from these words. The words may correspond to one or more commands, as well as certain keywords. The keyword may be, for example, a word in the voice input identifying a particular device or group in the MPS 100. For instance, in the illustrated example, the keyword may be one or more words identifying one or more zones in which the music is to be played, such as the Living Room and the Dining Room (FIG. 1A).

To determine the intent of the words, the VAS is typically in communication with one or more databases associated with the VAS (not shown) and/or one or more databases (not shown) of the MPS 100. Such databases may store various user data, analytics, catalogs, and other information for natural language processing and/or other processing. In some implementations, such databases may be updated for adaptive learning and feedback for a neural network based on voice-input processing. In some cases, the utterance portion may include additional information, such as detected pauses (e.g., periods of non-speech) between words spoken by a user, as shown in FIG. 2C. The pauses may demarcate the locations of separate commands, keywords, or other information spoke by the user within the utterance portion.

After processing the voice input, the VAS may send a response to the MPS 100 with an instruction to perform one or more actions based on an intent it determined from the voice input. For example, based on the voice input, the VAS may direct the MPS 100 to initiate playback on one or more of the playback devices 102, control one or more of these playback devices 102 (e.g., raise/lower volume, group/ungroup devices, etc.), or turn on/off certain smart devices, among other actions. After receiving the response from the VAS, the wake-word engine 770a of the NMD 703 may resume or continue to monitor the sound-data stream $S_{DS1}$ until it spots another potential wake-word, as discussed above.

In general, the one or more identification algorithms that a particular VAS wake-word engine, such as the VAS wake-word engine 770a, applies are configured to analyze certain characteristics of the detected sound stream $S_{DS}$ and compare those characteristics to corresponding characteristics of the particular VAS wake-word engine's one or more particular VAS wake words. For example, the wake-word engine 770a may apply one or more identification algorithms to spot temporal and spectral characteristics in the detected sound stream $S_{DS}$ that match the temporal and spectral characteristics of the engine's one or more wake words, and thereby determine that the detected sound $S_D$ comprises a voice input including a particular VAS wake word.

In some implementations, the one or more identification algorithms may be third-party identification algorithms (i.e., developed by a company other than the company that provides the NMD 703). For instance, operators of a voice service (e.g., AMAZON) may make their respective algorithms (e.g., identification algorithms corresponding to AMAZON's ALEXA) available for use in third-party devices (e.g., the NMDs 103), which are then trained to identify one or more wake words for the particular voice assistant service. Additionally, or alternatively, the one or more identification algorithms may be first-party identification algorithms that are developed and trained to identify certain wake words that are not necessarily particular to a given voice service. Other possibilities also exist.

As noted above, the NMD 703 also includes a keyword engine 771 in parallel with the VAS wake-word engine 770*a*. Like the VAS wake-word engine 770*a*, the keyword engine 771 may apply one or more identification algorithms corresponding to one or more wake words. A "command-keyword event" is generated when a particular command keyword is identified in the detected sound $S_D$. In contrast to the nonce words typically as utilized as VAS wake words, command keywords function as both the activation word and the command itself. For instance, example command keywords may correspond to playback commands (e.g., "play," "pause," "skip," etc.) as well as control commands ("turn on"), among other examples. Under appropriate conditions, based on detecting one of these command keywords, the NMD 703 performs the corresponding command.

The keyword engine 771 can employ an automatic speech recognizer (ASR). The ASR is configured to output phonetic or phonemic representations, such as text corresponding to words, based on sound in the sound-data stream $S_{DS}$ to text. For instance, the ASR may transcribe spoken words represented in the sound-data stream $S_{DS}$ to one or more strings representing the voice input 780 as text. The keyword engine 771 can feed ASR output to a local natural language unit (NLU) that identifies particular keywords as being command keywords for invoking command-keyword events, as described below.

As noted above, in some example implementations, the NMD 703 is configured to perform natural language processing, which may be carried out using an onboard natural language understanding processor, referred to herein as a natural language unit (NLU). The local NLU is configured to analyze text output of the ASR of the keyword engine 771 to spot (i.e., detect or identify) keywords in the voice input 780. The local keyword engine 771 includes a library of keywords (i.e., words and phrases) corresponding to respective commands and/or parameters.

In one aspect, the library of the local keyword engine 771 includes command keywords. When the local keyword engine 771 identifies a command keyword in the signal, the keyword engine 771 generates a command-keyword event and performs a command corresponding to the command keyword in the signal.

Further, the library of the local keyword engine 771 may also include keywords corresponding to parameters. The local keyword engine 771 may then determine an underlying intent from the matched keywords in the voice input 780. For instance, if the local keyword engine 771 matches the keywords "David Bowie" and "kitchen" in combination with a play command, the local keyword engine 771 may determine an intent of playing David Bowie in the Kitchen 101*h* on the playback device 102*i*. In contrast to a processing of the voice input 780 by a cloud-based VAS, local processing of the voice input 780 by the local keyword engine 771 may be relatively less sophisticated, as the keyword engine 771 does not have access to the relatively greater processing capabilities and larger voice databases that a VAS generally has access to.

In some examples, the local keyword engine 771 may determine an intent with one or more slots, which correspond to respective keywords. For instance, referring back to the play David Bowie in the Kitchen example, when processing the voice input, the local keyword engine 771 may determine that an intent is to play music (e.g., intent=playMusic), while a first slot includes David Bowie as target content (e.g., slot1=DavidBowie) and a second slot includes the Kitchen 101*h* as the target playback device (e.g., slot2=kitchen). Here, the intent (to "playMusic") is based on the command keyword and the slots are parameters modifying the intent to a particular target content and playback device.

Some error in performing local automatic speech recognition is expected. Within examples, the keyword engine 771 may generate a confidence score when transcribing spoken words to text, which indicates how closely the spoken words in the voice input 780 matches the sound patterns for that word. In some implementations, generating a command-keyword event is based on the confidence score for a given command keyword. For instance, the keyword engine 771 may generate a command-keyword event when the confidence score for a given sound exceeds a given threshold value (e.g., 0.5 on a scale of 0-1, indicating that the given sound is more likely than not the command keyword). Conversely, when the confidence score for a given sound is at or below the given threshold value, the keyword engine 771 does not generate the command-keyword event.

Similarly, some error in performing keyword matching is expected. Within examples, the keyword engine 771 may generate a confidence score when determining an intent, which indicates how closely the transcribed words in the signal match the corresponding keywords in the library of the local keyword engine 771. In some implementations, performing an operation according to a determined intent is based on the confidence score for keywords. For instance, the NMD 703 may perform an operation according to a determined intent when the confidence score for a given sound exceeds a given threshold value (e.g., 0.5 on a scale of 0-1, indicating that the given sound is more likely than not the command keyword). Conversely, when the confidence score for a given intent is at or below the given threshold value, the NMD 703 does not perform the operation according to the determined intent.

As noted above, in some implementations, a phrase may be used as a command keyword, which provides additional syllables to match (or not match). For instance, the phrase "play me some music" has more syllables than "play," which provides additional sound patterns to match to words. Accordingly, command keywords that are phrases may generally be less prone to false wake word triggers.

As indicated above, the NMD 703 generates a command-keyword event (and performs a command corresponding to the detected command keyword) only when certain conditions corresponding to a detected command keyword are met. These conditions are intended to lower the prevalence of false positive command-keyword events. For instance, after detecting the command keyword "skip," the NMD 703 generates a command-keyword event (and skips to the next track) only when certain playback conditions indicating that a skip should be performed are met. These playback conditions may include, for example, (i) a first condition that a media item is being played back, (ii) a second condition that a queue is active, and (iii) a third condition that the queue includes a media item subsequent to the media item being played back. If any of these conditions are not satisfied, the command-keyword event is not generated (and no skip is performed).

The NMD 703 includes the one or more state machine(s) 775 to facilitate determining whether the appropriate conditions are met. The state machine 775 transitions between a first state and a second state based on whether one or more conditions corresponding to the detected command keyword are met. In particular, for a given command keyword corresponding to a particular command requiring one or more particular conditions, the state machine 775 transitions into a first state when one or more particular conditions are satisfied and transitions into a second state when at least one condition of the one or more particular conditions is not satisfied.

Within example implementations, the command conditions are based on states indicated in state variables. As noted above, the devices of the MPS 100 may store state variables describing the state of the respective device. For instance, the playback devices 102 may store state variables indicating the state of the playback devices 102, such as the audio content currently playing (or paused), the volume levels, network connection status, and the like). These state variables are updated (e.g., periodically, or based on an event (i.e., when a state in a state variable changes)) and the state variables further can be shared among the devices of the MPS 100, including the NMD 703.

Similarly, the NMD 703 may maintain these state variables (either by virtue of being implemented in a playback device or as a stand-alone NMD). The state machine 775 monitors the states indicated in these state variables, and determines whether the states indicated in the appropriate state variables indicate that the command condition(s) are satisfied. Based on these determinations, the state machine 775 transitions between the first state and the second state, as described above.

Other example conditions may be based on the output of a voice activity detector ("VAD") 765. The VAD 765 is configured to detect the presence (or lack thereof) of voice activity in the sound-data stream SDS. In particular, the VAD 765 may analyze frames corresponding to the pre-roll portion of the voice input 780 (FIG. 2D) with one or more voice detection algorithms to determine whether voice activity was present in the environment in certain time windows prior to a keyword portion of the voice input 780.

The VAD 765 may utilize any suitable voice activity detection algorithms. Example voice detection algorithms involve determining whether a given frame includes one or more features or qualities that correspond to voice activity, and further determining whether those features or qualities diverge from noise to a given extent (e.g., if a value exceeds a threshold for a given frame). Some example voice detection algorithms involve filtering or otherwise reducing noise in the frames prior to identifying the features or qualities.

In some examples, the VAD 765 may determine whether voice activity is present in the environment based on one or more metrics. For example, the VAD 765 can be configured distinguish between frames that include voice activity and frames that don't include voice activity. The frames that the VAD determines have voice activity may be caused by speech regardless of whether it near- or far-field. In this example and others, the VAD 765 may determine a count of frames in the pre-roll portion of the voice input 780 that indicate voice activity. If this count exceeds a threshold percentage or number of frames, the VAD 765 may be configured to output a signal or set a state variable indicating that voice activity is present in the environment. Other metrics may be used as well in addition to, or as an alternative to, such a count.

The presence of voice activity in an environment may indicate that a voice input is being directed to the NMD 73. Accordingly, when the VAD 765 indicates that voice activity is not present in the environment (perhaps as indicated by a state variable set by the VAD 765) this may be configured as one of the command conditions for the command keywords. When this condition is met (i.e., the VAD 765 indicates that voice activity is present in the environment), the state machine 775 will transition to the first state to enable performing commands based on command keywords, so long as any other conditions for a particular command keyword are satisfied.

Further, in some implementations, the NMD 703 may include a noise classifier 766. The noise classifier 766 is configured to determine sound metadata (frequency response, signal levels, etc.) and identify signatures in the sound metadata corresponding to various noise sources. The noise classifier 766 may include a neural network or other mathematical model configured to identify different types of noise in detected sound data or metadata. One classification of noise may be speech (e.g., far-field speech). Another classification may be a specific type of speech, such as background speech, and example of which is described in greater detail with reference to FIG. 8. Background speech may be differentiated from other types of voice-like activity, such as more general voice activity (e.g., cadence, pauses, or other characteristics) of voice-like activity detected by the VAD 765.

For example, analyzing the sound metadata can include comparing one or more features of the sound metadata with known noise reference values or a sample population data with known noise. For example, any features of the sound metadata such as signal levels, frequency response spectra, etc. can be compared with noise reference values or values collected and averaged over a sample population. In some examples, analyzing the sound metadata includes projecting the frequency response spectrum onto an eigenspace corresponding to aggregated frequency response spectra from a population of NMDs. Further, projecting the frequency response spectrum onto an eigenspace can be performed as a pre-processing step to facilitate downstream classification.

In various embodiments, any number of different techniques for classification of noise using the sound metadata can be used, for example machine learning using decision trees, or Bayesian classifiers, neural networks, or any other classification techniques. Alternatively or additionally, various clustering techniques may be used, for example K-Means clustering, mean-shift clustering, expectation-maximization clustering, or any other suitable clustering technique. Techniques to classify noise may include one or more techniques disclosed in U.S. application Ser. No. 16/227,308 filed Dec. 20, 2018, and titled "Optimization of Network Microphone Devices Using Noise Classification," which is herein incorporated by reference in its entirety.

Referring back to FIG. 7A, in some implementations, the additional buffer 769 (shown in dashed lines) may store information (e.g., metadata or the like) regarding the detected sound $S_D$ that was processed by the upstream AEC 763 and spatial processor 764. This additional buffer 769 may be referred to as a "sound metadata buffer." Examples of such sound metadata include: (1) frequency response data, (2) echo return loss enhancement measures, (3) voice direction measures; (4) arbitration statistics; and/or (5) speech spectral data. In example implementations, the noise classifier 766 may analyze the sound metadata in the buffer 769 to classify noise in the detected sound SD.

As noted above, one classification of sound may be background speech, such as speech indicative of far-field speech and/or speech indicative of a conversation not involving the NMD 703. The noise classifier 766 may output a signal and/or set a state variable indicating that background speech is present in the environment. The presence of voice activity (i.e., speech) in the pre-roll portion of the voice input 780 indicates that the voice input 780 might not be directed to the NMD 703, but instead be conversational speech within the environment. For instance, a household member might speak something like "our kids should have a play date soon" without intending to direct the command keyword "play" to the NMD 703.

Further, when the noise classifier indicates that background speech is present is present in the environment, this condition may disable the keyword engine 771. In some implementations, the condition of background speech being absent in the environment (perhaps as indicated by a state variable set by the noise classifier 766) is configured as one of the command conditions for the command keywords. Accordingly, the state machine 775 will not transition to the first state when the noise classifier 766 indicates that background speech is present in the environment.

Further, the noise classifier 766 may determine whether background speech is present in the environment based on one or more metrics. For example, the noise classifier 766 may determine a count of frames in the pre-roll portion of the voice input 780 that indicate background speech. If this count exceeds a threshold percentage or number of frames, the noise classifier 766 may be configured to output the signal or set the state variable indicating that background speech is present in the environment. Other metrics may be used as well in addition to, or as an alternative to, such a count.

Referring back to FIG. 7A, in some examples, one or more additional keyword engines may be provided, for example including custom keyword engines. Cloud service providers, such as streaming audio services, may provide a custom keyword engine pre-configured with identification algorithms configured to spot service-specific command keywords. These service-specific command keywords may include commands for custom service features and/or custom names used in accessing the service.

For instance, the NMD 703 may include a particular streaming audio service (e.g., Apple Music) keyword engine. This particular keyword engine may be configured to detect command keywords specific to the particular streaming audio service and generate streaming audio service wake word events. For instance, one command keyword may be "Friends Mix," which corresponds to a command to play back a custom playlist generated from playback histories of one or more "friends" within the particular streaming audio service.

In some embodiments, different NMDs 703 of the same media playback system 100 can have different additional custom keyword engines. For example, a first NMD may include a custom keyword engine configured with a library of keywords configured for a particular streaming audio service (e.g., Apple Music) while a second NMD includes a custom-command keyword engine configured with a library of keywords configured to a different streaming audio service (e.g., Spotify). In operation, voice input received at either NMD may be transmitted to the other NMD for processing, such that in combination the media playback system may effectively evaluate voice input for keywords with the benefit of multiple different custom keyword engines distributed among multiple different NMDs 703.

Referring back to FIG. 7A, in example embodiments, the VAS wake-word engine 770a and the keyword engine 771 may take a variety of forms. For example, the VAS wake-word engine 770a and the keyword engine 771 may take the form of one or more modules that are stored in memory of the NMD 703 (e.g., the memory 112b of FIG. 1F). As another example, the VAS wake-word engine 770a and the keyword engine 771 may take the form of a general purposes or special-purpose processor, or modules thereof. In this respect, multiple wake word engines 770 and 771 may be part of the same component of the NMD 703 or each wake-word engine 770 and 771 may take the form of a component that is dedicated for the particular wake-word engine. Other possibilities also exist.

To further reduce false positives, the keyword engine 771 may utilize a relative low sensitivity compared with the VAS wake-word engine 770a. In practice, a wake-word engine may include a sensitivity level setting that is modifiable. The sensitivity level may define a degree of similarity between a word identified in the detected sound stream $S_{DS1}$ and the wake-word engine's one or more particular wake words that is considered to be a match (i.e., that triggers a VAS wake-word or command-keyword event). In other words, the sensitivity level defines how closely, as one example, the spectral characteristics in the detected sound stream Sps2 must match the spectral characteristics of the engine's one or more wake words to be a wake-word trigger.

In this respect, the sensitivity level generally controls how many false positives that the VAS wake-word engine 770a and keyword engine 771 identifies. For example, if the VAS wake-word engine 770a is configured to identify the wake-word "Alexa" with a relatively high sensitivity, then false wake words of "Election" or "Lexus" may cause the wake-word engine 770a to flag the presence of the wake-word "Alexa." In contrast, if the keyword engine 771 is configured with a relatively low sensitivity, then the false wake words of "may" or "day" would not cause the keyword engine 771 to flag the presence of the command keyword "Play."

In practice, a sensitivity level may take a variety of forms. In example implementations, a sensitivity level takes the form of a confidence threshold that defines a minimum confidence (i.e., probability) level for a wake-word engine that serves as a dividing line between triggering or not triggering a wake-word event when the wake-word engine is analyzing detected sound for its particular wake word. In this regard, a higher sensitivity level corresponds to a lower confidence threshold (and more false positives), whereas a lower sensitivity level corresponds to a higher confidence threshold (and fewer false positives). For example, lowering a wake-word engine's confidence threshold configures it to trigger a wake-word event when it identifies words that have a lower likelihood that they are the actual particular wake word, whereas raising the confidence threshold configures the engine to trigger a wake-word event when it identifies words that have a higher likelihood that they are the actual particular wake word. Within examples, a sensitivity level of the keyword engine 771 may be based on more or more confidence scores, such as the confidence score in spotting a command keyword and/or a confidence score in determining an intent. Other examples of sensitivity levels are also possible.

In example implementations, sensitivity level parameters (e.g., the range of sensitivities) for a particular wake-word engine can be updated, which may occur in a variety of manners. As one possibility, a VAS or other third-party provider of a given wake-word engine may provide to the NMD 703 a wake-word engine update that modifies one or more sensitivity level parameters for the given VAS wake-word engine 770*a*. By contrast, the sensitive level parameters of the keyword engine 771 may be configured by the manufacturer of the NMD 703 or by another cloud service (e.g., for a custom wake-word engine).

Notably, within certain examples, the NMD 703 foregoes sending any data representing the detected sound $S_D$ (e.g., the messages $M_V$) to a VAS when processing a voice input 780 including a command keyword. In implementations including the local keyword engine 771, the NMD 703 can further process the voice utterance portion of the voice input 780 (in addition to the keyword word portion) without necessarily sending the voice utterance portion of the voice input 780 to the VAS. Accordingly, speaking a voice input 780 (with a command keyword) to the NMD 703 may provide increased privacy relative to other NMDs that process all voice inputs using a VAS.

As indicated above, the keywords in the library of the keyword engine 771 can correspond to parameters. These parameters may define to perform the command corresponding to the detected command keyword. When keywords are recognized in the voice input 780, the command corresponding to the detected command keyword is performed according to parameters corresponding to the detected keywords.

For instance, an example voice input 780 may be "play music at low volume" with "play" being the command keyword portion (corresponding to a playback command) and "music at low volume" being the voice utterance portion. When analyzing this voice input 780, the keyword engine 771 may recognize that "low volume" is a keyword in its library corresponding to a parameter representing a certain (low) volume level. Accordingly, the keyword engine 771 may determine an intent to play at this lower volume level. Then, when performing the playback command corresponding to "play," this command is performed according to the parameter representing a certain volume level.

In a second example, another example voice input 780 may be "play my favorites in the Kitchen" with "play" again being the command keyword portion (corresponding to a playback command) and "my favorites in the Kitchen" as the voice utterance portion. When analyzing this voice input 780, the keyword engine 771 may recognize that "favorites" and "Kitchen" match keywords in its library. In particular, "favorites" corresponds to a first parameter representing particular audio content (i.e., a particular playlist that includes a user's favorite audio tracks) while "Kitchen" corresponds to a second parameter representing a target for the playback command (i.e., the kitchen 101*h* zone. Accordingly, the keyword engine 771 may determine an intent to play this particular playlist in the kitchen 101*h* zone.

In a third example, a further example voice input 780 may be "volume up" with "volume" being the command keyword portion (corresponding to a volume adjustment command) and "up" being the voice utterance portion. When analyzing this voice input 780, the keyword engine 771 may recognize that "up" is a keyword in its library corresponding to a parameter representing a certain volume increase (e.g., a 10-point increase on a 100-point volume scale). Accordingly, the keyword engine 771 may determine an intent to increase volume. Then, when performing the volume adjustment command corresponding to "volume," this command is performed according to the parameter representing the certain volume increase.

Within examples, certain command keywords are functionally linked to a subset of the keywords within the library of the keyword engine 771, which may hasten analysis. For instance, the command keyword "skip" may be functionality linked to the keywords "forward" and "backward" and their cognates. Accordingly, when the command keyword "skip" is detected in a given voice input 780, analyzing the voice utterance portion of that voice input 780 with the local keyword engine 771 may involve determining whether the voice input 780 includes any keywords that match these functionally linked keywords (rather than determining whether the voice input 780 includes any keywords that match any keyword in the library of the local keyword engine 771). Since vastly fewer keywords are checked, this analysis is relatively quicker than a full search of the library. By contrast, a nonce VAS wake word such as "Alexa" provides no indication as to the scope of the accompanying voice input.

Some commands may require one or more parameters, as such the command keyword alone does not provide enough information to perform the corresponding command. For example, the command keyword "volume" might require a parameter to specify a volume increase or decrease, as the intent of "volume" of volume alone is unclear. As another example, the command keyword "group" may require two or more parameters identifying the target devices to group.

Accordingly, in some example implementations, when a given command keyword is detected in the voice input 780 by the keyword engine 771, the local keyword engine 771 may determine whether the voice input 780 includes keywords matching keywords in the library corresponding to the required parameters. If the voice input 780 does include keywords matching the required parameters, the NMD 703 proceeds to perform the command (corresponding to the given command keyword) according to the parameters specified by the keywords.

However, if the voice input 780 does include keywords matching the required parameters for the command, the NMD 703 may prompt the user to provide the parameters. For instance, in a first example, the NMD 703 may play an audible prompt such as "I've heard a command, but I need more information" or "Can I help you with something?" Alternatively, the NMD 703 may send a prompt to a user's personal device via a control application (e.g., the software components 132*c* of the control device(s) 104).

In further examples, the NMD 703 may play an audible prompt customized to the detected command keyword. For instance, after detecting a command keyword corresponding to a volume adjustment command (e.g., "volume"), the audible prompt may include a more specific request such as "Do you want to adjust the volume up or down?" As another example, for a grouping command corresponding to the command keyword "group," the audible prompt may be "Which devices do you want to group?" Supporting such specific audible prompts may be made practicable by supporting a relatively limited number of command keywords (e.g., less than 100), but other implementations may support more command keywords with the trade-off of requiring additional memory and processing capability.

Within additional examples, when a voice utterance portion does not include keywords corresponding to one or more required parameters, the NMD 703 may perform the corresponding command according to one or more default parameters. For instance, if a playback command does not include keywords indicating target playback devices 102 for playback, the NMD 703 may default to playback on the NMD 703 itself (e.g., if the NMD 703 is implemented within a playback device 102) or to playback on one or more associated playback devices 102 (e.g., playback devices 102 in the same room or zone as the NMD 703). Further, in some examples, the user may configure default parameters using a graphical user interface (e.g., user interface 430) or voice user interface. For example, if a grouping command does not specify the playback devices 102 to group, the NMD 703 may default to instructing two or more pre-configured default playback devices 102 to form a synchrony group. Default parameters may be stored in data storage (e.g., the memory 112b (FIG. 1F)) and accessed when the NMD 703 determines that keywords exclude certain parameters. Other examples are possible as well.

In some cases, the NMD 703 sends the voice input 780 to a VAS when the keyword engine 771 is unable to process the voice input 780 (e.g., when the local keyword engine 771 is unable to find matches to keywords in the library, or when the local keyword engine 771 has a low confidence score as to intent). In an example, to trigger sending the voice input 780, the NMD 703 may generate a bridging event, which causes the voice extractor 773 to process the sound-data stream SD, as discussed above. That is, the NMD 703 generates a bridging event to trigger the voice extractor 773 without a VAS wake-word being detected by the VAS wake word engine 770a (instead based on a command keyword in the voice input 780, as well as the keyword engine 771 being unable to process the voice input 780).

Before sending the voice input 780 to the VAS (e.g., via the messages Mv), the NMD 703 may obtain confirmation from the user that the user acquiesces to the voice input 780 being sent to the VAS. For instance, the NMD 703 may play an audible prompt to send the voice input to a default or otherwise configured VAS, such as "I'm sorry, I didn't understand that. May I ask Alexa?" In another example, the NMD 703 may play an audible prompt using a VAS voice (i.e., a voice that is known to most users as being associated with a particular VAS), such as "Can I help you with something?" In such examples, generation of the bridging event (and triggering of the voice extractor 773) is contingent on a second affirmative voice input 780 from the user.

Within certain example implementations, the local keyword engine 771 may process the signal SASR without necessarily a command-keyword event being generated by the keyword engine 771 (i.e., directly). That is, the automatic speech recognition 772 may be configured to perform automatic speech recognition on the sound-data stream SD, which the local keyword engine 771 processes for matching keywords without requiring a command-keyword event. If keywords in the voice input 780 are found to match keywords corresponding to a command (possibly with one or more keywords corresponding to one or more parameters), the NMD 703 performs the command according to the one or more parameters.

In some examples, the library of the local keyword engine 771 is partially customized to the individual user(s). In a first aspect, the library may be customized to the devices that are within the household of the NMD (e.g., the household within the environment 101 (FIG. 1A)). For instance, the library of the local keyword engine 771 may include keywords corresponding to the names of the devices within the household, such as the zone names of the playback devices 102 in the MPS 100. In a second aspect, the library may be customized to the users of the devices within the household. For example, the library of the local keyword engine 771 may include keywords corresponding to names or other identifiers of a user's preferred playlists, artists, albums, and the like. Then, the user may refer to these names or identifiers when directing voice inputs to the keyword engine 771. In some embodiments, different NMDs 703 of the same media playback system 100 can have different keyword engines 771 with different customized libraries. For example, a first NMD may include a first subset of device and zone names, and a second NMD may include a second subset of device and zone names.

Within example implementations, the NMD 703 may populate the library of the local keyword engine 771 locally within the network 111 (FIG. 1B). As noted above, the NMD 703 may maintain or have access to state variables indicating the respective states of devices connected to the network 111 (e.g., the playback devices 104). These state variables may include names of the various devices. For instance, the kitchen 101h may include the playback device 102b, which are assigned the zone name "Kitchen." The NMD 703 may read these names from the state variables and include them in the library of the local keyword engine 771 by training the local keyword engine 771 to recognize them as keywords. The keyword entry for a given name may then be associated with the corresponding device in an associated parameter (e.g., by an identifier of the device, such as a MAC address or IP address). The NMD 703 can then use the parameters to customize control commands and direct the commands to a particular device.

In further examples, the NMD 703 may populate the library by discovering devices connected to the network 111. For instance, the NMD 703 may transmit discovery requests via the network 111 according to a protocol configured for device discovery, such as universal plug-and-play (UPnP) or zero-configuration networking. Devices on the network 111 may then respond to the discovery requests and exchange data representing the device names, identifiers, addresses and the like to facilitate communication and control via the network 111. The NMD 703 may read these names from the exchanged messages and include them in the library of the local keyword engine 771 by training the local keyword engine 771 to recognize them as keywords.

Figure 7B:
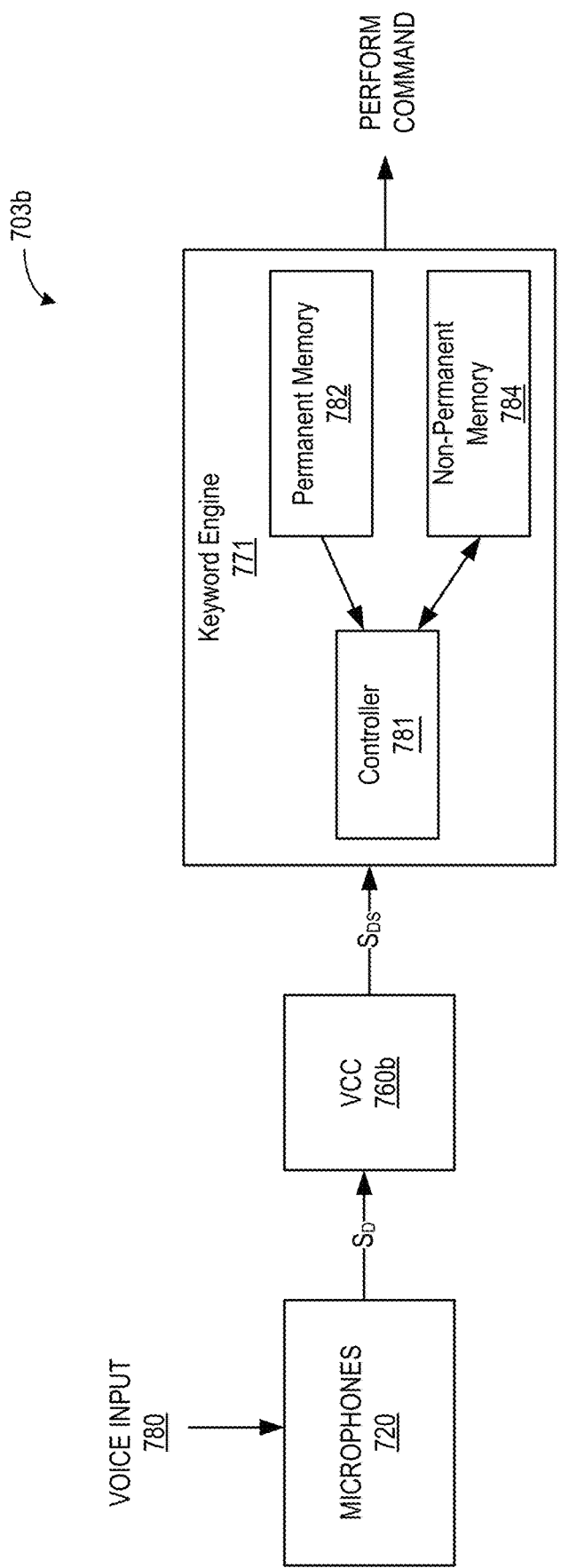
FIG. 7B is a functional block diagram of certain components of another example network microphone device in accordance with aspects of the disclosure.

FIG. 7B illustrates another example of an NMD 703b configured to process voice input to detect keywords. The NMD 703b can include some or all of the components of the NMD 703a described above with respect to FIG. 7A. With reference to FIG. 7B, the NMD 703b can include a plurality of microphones 720 configured to capture voice input 780 and output detected sound $S_D$ to a VCC 760. The VCC 760 can include any suitable components configured to process the sound data $S_D$ and output a sound data stream $S_{DS}$ suitable for input to the keyword engine 771. In various examples, the VCC 760 can include any one or more of the components described above with respect to the VCC 760 in FIG. 7A. As described previously, the keyword engine 771 can be configured to receive the sound data stream SDS, detect any keyword(s) therein, and cause a command to be performed in response. As seen in FIG. 7B, in at least some instances the NMD 703b can be configured to perform only local keyword detection, without necessarily communicating with or relying on a VAS or other remote computing devices.

The keyword engine 771 includes a controller 781 that is configured to process the sound data stream $S_{DS}$ and provide an output (e.g., an indication of a detected keyword), which may cause a command to be performed. The controller 781 can take any suitable form, such as a microcontroller unit (MCU), central processing unit (CPU), application-specific integrated chip (ASIC), or other suitable processing component(s). The controller 781 is communicatively coupled to permanent memory 782 and non-permanent memory 784 within the keyword engine 781. Permanent memory 782 can include, for example, flash or other non-volatile memory configured to maintain its stored data even if the keyword engine 771 is inactive or the NMD 703b is powered down. As described in more detail below, the permanent memory 782 can store, for example, a feature extraction algorithm, a feature evaluation algorithm, and/or any associated parameters. The non-permanent memory 784 can include, for example, DRAM or other volatile memory configured to provide rapid read and write access to the controller 781. In some embodiments, data stored in the non-permanent memory 784 does not persist when the keyword engine 771 is inactive and/or when the NMD 703b is powered down. Additionally or alternatively, the non-permanent memory 784 can be at least partially overwritten with iterative computational cycles performed by the controller 781 to process the incoming sound data stream Sips. As described in more detail below, the non-permanent memory 784 can be used to store data used to process the sound data stream $S_{DS}$ via the extraction algorithm and/or the feature evaluation algorithm stored in permanent memory 782. For example, the non-permanent memory 784 can be configured to store inputs, outputs, and computational data associated with the feature extraction algorithm and/or the feature evaluation algorithm.

While the data stored in permanent memory 782 may be relatively static, the data stored in non-permanent memory 784 can be dynamically updated during processing of voice input 780 via the NMD 703b. As described in more detail below, the non-permanent memory 784 can be allocated to select sub-tasks of the keyword engine 771 such that the available memory is efficiently utilized. In embodiments utilizing an MCU, memory allocation may be more rigidly pre-defined than with embodiments utilizing a CPU, for example. As such, when using an MCU as the controller 781, it can be particularly beneficial to efficiently allocate memory in a manner that facilitates local keyword detection.

IV. Memory Optimization for Keyword Engines

Keyword engines can be highly memory intensive, particularly in the case of keyword engines utilizing neural network models or other similarly computationally complex algorithms. Accordingly, it can be beneficial to efficiently allocate memory resources for use in keyword detection, to save cost and/or to enable the use of more complex and/or memory-intensive keyword detection algorithms.

Figure 8:
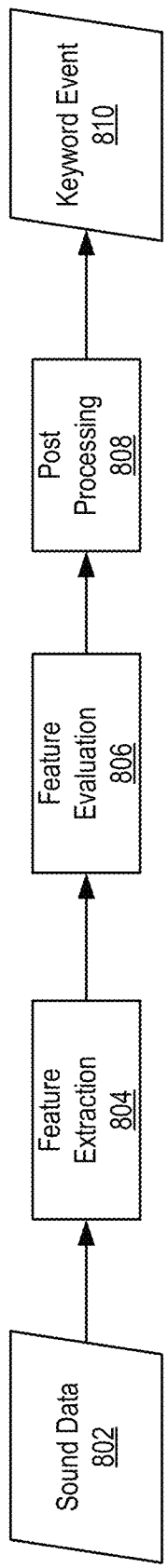
FIG. 8 is a functional flow diagram of a method for processing sound data in accordance with aspects of the disclosure.

FIG. 8 is a functional flow diagram of a method for processing sound data in accordance with aspects of the disclosure. As illustrated, sound data 802 is provided as input for feature extraction 804. The sound data 802 can include, for example, the sound-data stream $S_{DS}$ described above with respect to FIGS. 7A and 7B. The feature extraction 804 can be configured to derive features suitable for use in the downstream feature evaluation 806. For example, the feature extraction 804 can derive features by quantifying physical characteristics of the sound data. In various examples, the feature extraction 804 can provide feature(s) in the form of a vector or matrix. Extracted features can take any suitable form, for example mel-frequency cepstrum coefficients (MFCC), bark frequency cepstrum coefficients, linear prediction filter coefficients, perceptual linear predictions, or other suitable feature. In some instances, a combination of cepstrum, power, and one or more regression coefficients of these features can be used. In some instances, normalization processing may also be used.

As noted previously, in some embodiments the feature extraction 804 can evaluate multiple frames of sound data utilizing a sliding window approach. For example, a given window (e.g., a number of frames) of the sound data 802 can be used together to extract features. With each subsequent frame of input sound data, the oldest frame can be discarded, and the feature extraction 804 can repeat. For example, the feature extraction 804 may process 10 frames of sound data 802, with each frame representing 10 ms of captured sound. With each subsequent frame of captured sound, the oldest frame can be discarded, the new frame can be combined with the previous 9 for processing via the feature extraction 804.

Feature evaluation 806 can process the extracted features output from the feature extraction 804 (e.g., MFCC or other suitable features) and output a classification (e.g., a keyword detection, optionally with an associated confidence score). In some examples, the feature evaluation 806 can include a neural network model that has been configured (e.g., trained) to detect keywords based on input features from feature extraction 804. Examples of such neural networks include deep neural networks (DNNs), convolutional neural networks (CNNs), or recurrent neural networks (RNNs), which can be used to model the keywords based on large amounts of keyword-specific training data. In some embodiments, the feature evaluation 806 can use evaluation algorithms other than neural network models, for example linear discriminant analysis, semi-tied covariance matrices, or other approaches.

The feature evaluation 806 can provide an output for post processing 808. The output can include, for example a classification such as a detected keyword. In some instances, the classification can include an associated confidence score or interval. The post processing 808 can include comparing the output of the feature evaluation 806 with the output of previous iterations. As noted above, the feature extraction 804 can operate iteratively on an incoming stream of sound data, with each feature extraction 804 processing a particular set of frames, with the same frame being included in multiple sequential iterations. For example, in the case of feature extraction 804 performed on 10 frames of sound data with a sliding window approach, a particular frame of sound data will be included in 10 iterations of feature extraction, with each iteration including a different combination of frames of the sound data 802. These iterative outputs of the feature extraction 804 will in turn each be processed via feature evaluation 806. As such, subsequent outputs of the feature evaluation 806 can include an evaluation of overlapping portions of the sound data 802. For example, a voice input of "play" may be captured a single frame of sound data, yet this frame will be included in 10 sequential iterations of feature extraction 804 and feature evaluation 806. Accordingly, the output of the feature evaluation 806 (e.g., the identification of a keyword) can be compared with previous outputs to confirm or disconfirm the keyword identification. In some instances, the post processing 808 can include confirming that an output of the feature evaluation 806 includes the same detected keyword(s) in at least a predetermined threshold number of iterations (e.g., at least 2, 3, 4, 5, or more iterations of the feature evaluation 806 detect the same keyword(s)).

Following post processing 808, a keyword event 810 can be output, indicating that a keyword has been detected with a confidence exceeding a predetermined threshold. As described previously, the keyword event 810 can cause the NMD to perform subsequent actions, such as controlling playback of audio content, providing an audible response to the user, sending data to one or more remote devices, or any other suitable action.

Each of the keyword-detection processes shown in FIG. 8 (feature extraction 804, feature evaluation 806, and post processing 808) rely on data stored in memory (e.g., permanent memory 782 and/or non-permanent memory 784 (FIG. 7B)). Additionally, the processes shown in FIG. 8 can include writing data to the non-permanent memory 784 (FIG. 7B). Because the keyword detection process can be memory-intensive, it is beneficial to effectively allocate memory resources on an as-needed basis for the processes shown in FIG. 8.

For example, the feature extraction algorithm (e.g., an MFCC algorithm) and/or the feature evaluation algorithm (e.g., a neural network model) may be stored in permanent memory, such as flash or other non-volatile memory. Because these algorithms need not change, they may be stored in permanent memory. In contrast, input data (e.g., the incoming sound data 802), output data (e.g., extracted features output from feature extraction 804, output classifications from feature evaluation 806), and associated computational data may be stored in non-permanent memory such as DRAM that allows rapid and dynamic access to memory. Because non-permanent memory such as DRAM is relatively expensive, it is advantageous to allocate portions of the non-permanent memory to the various sub-tasks associated with keyword detection such that each sub-task has sufficient memory to complete properly without requiring excessive memory capacity that remains largely unused. As described herein, embodiments of the present technology facilitate efficient use of non-permanent memory in a keyword engine by at least partially sharing allocated memory among sub-tasks of keyword detection.

Figure 9:
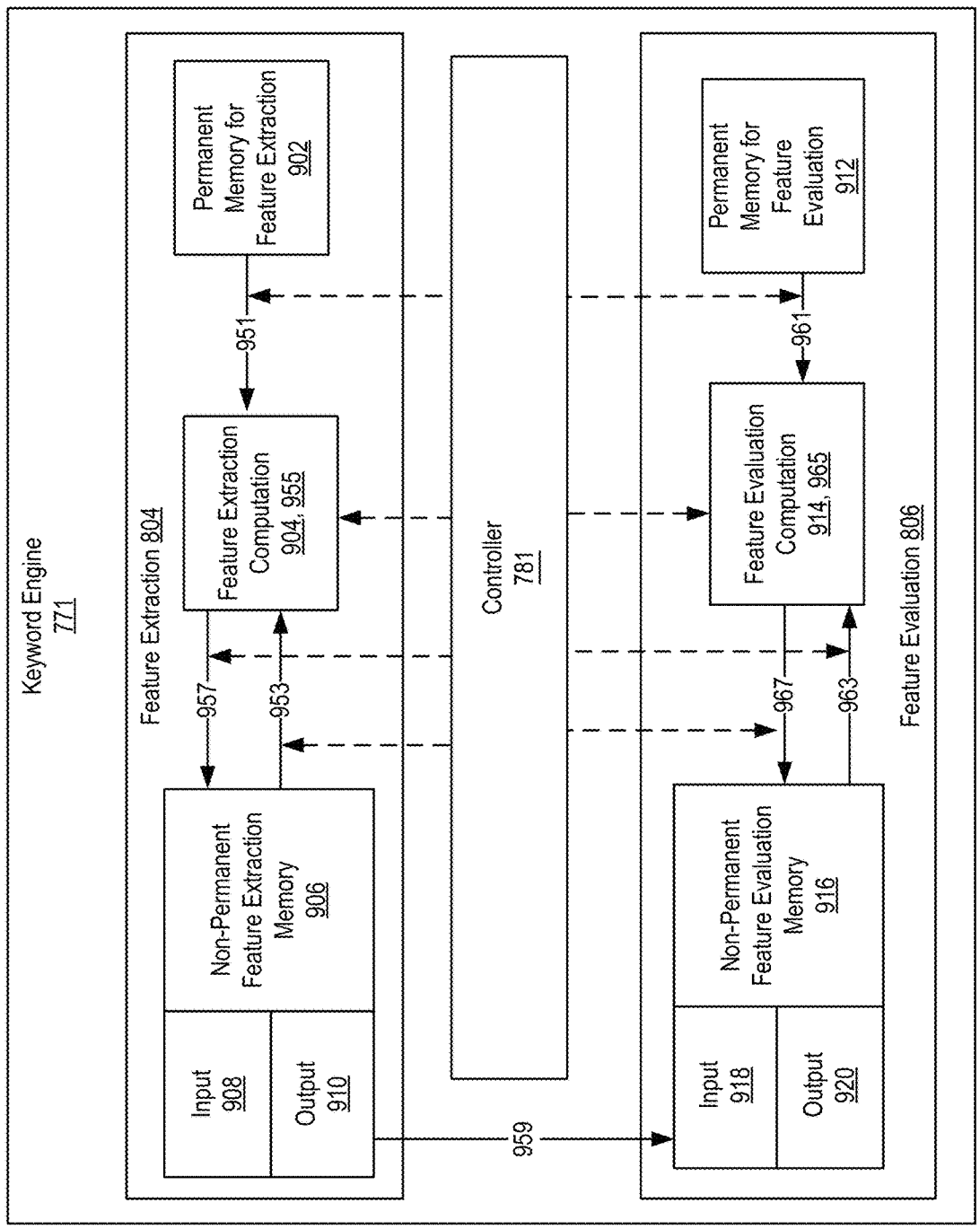
FIG. 9 is a functional block diagram illustrating a keyword engine in accordance with aspects of the disclosure.

FIG. 9 is a functional block diagram illustrating a keyword engine 771. The keyword engine 771 includes controller 781 (e.g., an MCU or other suitable processing component) and memory resources associated with feature extraction 804 and feature evaluation 806. Within feature extraction 804, for example, is permanent memory 902 for feature extraction. This permanent memory 902 can be, for example, a dedicated portion of permanent memory (e.g., flash or other non-volatile memory), and can store a feature extraction algorithm (e.g., an MFCC algorithm or other suitable algorithm). Feature extraction computation 904 represents the dynamic computations and associated data stored during the feature extraction process. The non-permanent feature extraction memory 906 includes input 908 (e.g., storing input sound data) and output 910 (e.g., storing extracted features as output from the feature extraction 804).

Although shown schematically as separate memory blocks, in some embodiments the permanent memory for feature extraction 902 and permanent memory for feature evaluation 912 can be take the form of contiguous or otherwise shared portions of the same physical memory structure (e.g., a flash memory chip). Similarly, although shown schematically as separate memory blocks, in some embodiments the non-permanent extraction memory 906 and the non-permanent evaluation memory 916 can take the form of contiguous or otherwise shared portions of the same physical memory structure (e.g., DRAM cells).

Similarly, within feature evaluation 806 is permanent memory 912 for feature evaluation. This permanent memory 912 can be, for example, a dedicated portion of permanent memory (e.g., flash memory), and can store a feature evaluation algorithm (e.g., a neural network model or other suitable algorithm and associated parameters). Feature evaluation computation 914 represents the dynamic computations and associated data stored during the feature evaluation process. As will be understood, these computations may be performed via the controller 781, with data relied upon for, and generated by, such computations being stored in non-permanent memory. The non-permanent feature evaluation memory 916 includes input 918 (e.g., storing the extracted features from the feature extraction 804 as inputs for a neural network model or other algorithm), and output 920 (e.g., storing output classifications such as detected keyword(s)).

In operation, the feature extraction computation 904 can be loaded with a feature extraction algorithm from permanent memory 902. Input (e.g., sound data) can be loaded to the feature extraction computation 904 from input 908 within the non-permanent memory 906 in advance of each computational step. Outputs from the feature extraction computation 904 (e.g., extracted features such as MFCCs) can be written back to the output 910 of the non-permanent memory 906.

The output 910 (e.g., extracted features) of the non-permanent memory 906 can be copied to the input 918 of the non-permanent memory 916 for feature evaluation 806. The feature evaluation computation 914 can be loaded with a feature evaluation algorithm (e.g., a neural network model) from permanent memory 912. Input (e.g., extracted features) can be loaded to the feature evaluation computation 914 from input 918 within the non-permanent memory 916 in advance of each computational step. The output of the feature evaluation computation 914 (e.g., an output classification such as detection of keyword(s)) can be written back to the output 920 of the non-permanent memory 916.

In various embodiments, a controller 781 is included within the keyword engine 771. In such embodiments, the controller 781 can direct all operations in the keyword engine 780. In various instances, the controller 781 can be central and/or distributed. The controller 781 can be configured to perform computations associated with feature evaluation and feature extraction, as well as to write data to pre-determined portions of the non-permanent memory, as described in more detail elsewhere herein.

Figure 10:
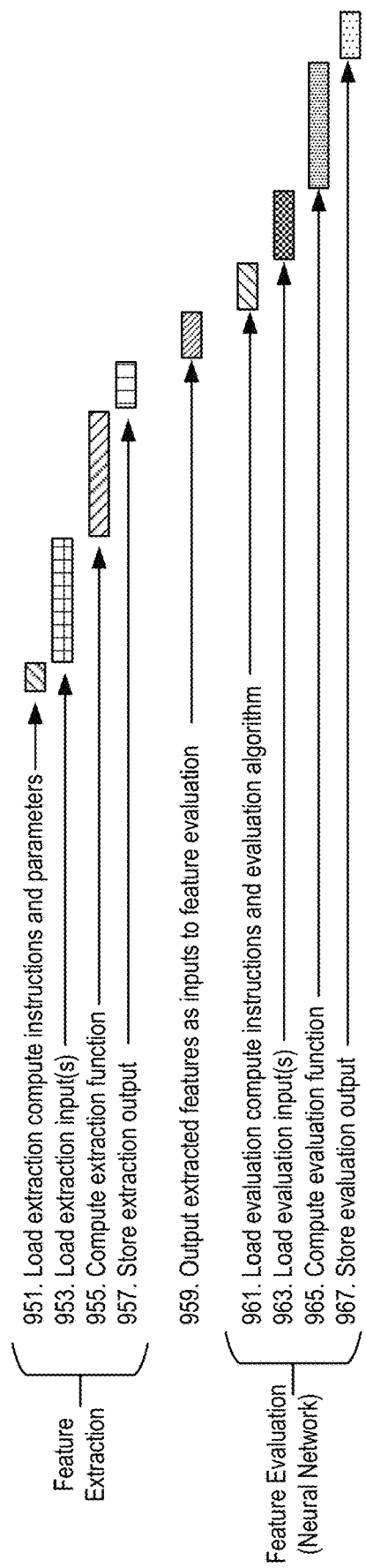
FIG. 10 is a pipelined timing diagram for the keyword engine of FIG. 9.

FIG. 10 is a pipelined timing diagram for the keyword engine 771 of FIG. 9. At 951, feature extraction compute instructions are loaded from the permanent memory 902 to feature extraction computation 904. At 953, input (e.g., one or more frames of sound data) is loaded from the non-permanent feature extraction memory 906 to the feature extraction computation 904. At 955, feature extraction computation is performed (e.g., via the controller 781) to generate extracted features (e.g., MFCCs or other suitable features). At 957, the results of the computation are stored in non-permanent feature extraction memory 906.

At 959, these extracted features are copied from the non-permanent feature extraction memory 906 to the non-permanent feature evaluation memory 916. In some embodiments, this copying can include transformation of the values, for example from float to integer or any other manipulation desired to facilitate use for the downstream feature evaluation computation.

At 961, feature evaluation compute instructions are loaded from the permanent memory 912 to feature evaluation computation 904. For example, the feature evaluation compute instructions can include a neural network model and optionally any associated parameters. At 963, inputs (e.g., extracted features) are loaded from the non-permanent feature evaluation memory 916 to the feature evaluation computation 914. At 965, feature evaluation computation is performed (e.g., via the controller 781) to generate output classifications (e.g., identifying detected keyword(s)). At 967, the results of the computation are stored in non-permanent feature extraction memory 906.

As illustrated in FIG. 10, these stages may be pipelined in order to provide efficient usage of computational and memory resources of the keyword engine 771. Although the pipeline timing diagram in FIG. 10 illustrates each stage being performed serially (with one stage completing before the next begins), in some instances one or more of the stages may be performed concurrently with another stage. Additionally, although the timing diagram in FIG. 10 illustrates each step being performed serially with substantially no timing gap between subsequent stages, in some embodiments there may be timing gaps between any two stages.

FIG. 10 illustrates a number of processes for a single computational cycle. As used herein, "computational cycle" includes processing of a single new frame of sound data input, from input to the feature extraction, through to the output of the feature evaluation (e.g., a classification output from a neural network model). As noted previously, keyword detection can be performed on a rolling basis with new frames of sound data being provided continuously as new input. As such, the process illustrated in FIG. 10 can be repeated serially with a new computational cycle for each subsequent input while the keyword engine is active. As described in more detail below, one or more portions of the non-permanent memory can be overwritten within a single computational cycle and/or between subsequent computational cycles.

FIG. 11 illustrates an example allocation of the non-permanent memory during the keyword detection process illustrated in FIGS. 9 and 10. In this schematic illustration, each row reflects memory consumption at a particular time, and the width of the bars within each row reflect relative amounts of memory consumption. Unused memory capacity is shown with cross-hatching. Not shown in FIG. 11 is the permanent memory, the contents of which may remain unchanged throughout. For example, the permanent memory may store the feature extraction algorithm (e.g., an MFCC algorithm) and the feature evaluation algorithm (e.g., a neural network model), and/or other data.

As noted previously, the non-permanent memory can be divided between temporary memory and persistent memory. As used herein, "temporary memory" includes a portion of non-permanent memory that is configured to be overwritten continuously, or at least at a higher rate than the persistent memory. For example, data stored within the persistent memory may be stored for a number of computational cycles performed by the keyword engine, while data stored within the temporary memory may be at least partially overwritten with each subsequent computational cycle. At various times, the non-permanent memory may store one or more of: (1) input samples for feature extraction (e.g., input sound samples), (2) computations associated with feature extraction, (3) an output of extracted features, (4) input(s) to a feature evaluation algorithm (e.g., a neural network model), (5) computations associated feature evaluation, and (6) outputs of the feature evaluation (e.g., an output classification from a neural network model).

One conventional approach to allocating non-permanent memory for keyword detection is to assign discrete, non-overlapping portions of the non-permanent memory for each of these data types, with the amount of memory for each portion being sized to accommodate the maximum required data for that data type during the keyword-detection process. This approach can lead to significant wasted memory space. Because many of the sub-tasks performed by the keyword engine are performed serially, certain portions of the temporary memory can be overwritten during a computational cycle, thereby reducing the overall memory resources required. In the embodiment illustrated in FIG. 11, for example, the extractor input (Extr. Input 1), extracted output (Extr. Output 1), evaluation inputs (Eval. Input 1), and final evaluation outputs (Eval. Output 4) can all be stored in persistent memory, such that they are only overwritten (or partially overwritten) in subsequent computational cycles. However, the data associated with extraction computations and evaluation computations can be stored in temporary memory, such that one data type can overwrite the other within a single computational cycle. In other words, a single portion of the non-permanent memory (e.g., DRAM) is allocated to be shared between the extraction computations and the evaluation computations. This sharing can reduce the overall capacity of non-permanent memory required for operation of the keyword engine.

With reference to FIG. 11, at time T0, there is no data within the temporary memory. This assumes an initial state in which there is no data stored from previous computational cycles. In practice, there may remain data from previous computational cycles that is designated to be overwritten. Also at time T0, input samples (e.g., sound samples provided as input for feature extraction) are stored in the persistent memory (Extr. Input 1). Because this memory is persistent, these input samples remain within the persistent memory throughout the computational cycle (e.g., through time T5 shown in FIG. 11). At time T1, extraction computation data (Extr. Comp.) is stored in temporary memory as a result of the extraction computation performed on the input samples. At time T2, the output of the extraction computation (Extr. Output 1) is stored within the persistent memory. At this time, the extraction computation data need not be retained and may be overwritten. In operation, this data may remain stored in the temporary memory until it is subsequently overwritten by new data.

At time T2, the extracted samples (Extr. Output 1) are copied as evaluation inputs (Eval. Input 1) and stored within persistent memory. Also at time T2, evaluation computation data (Eval. Comp. 1) is stored in temporary memory during the feature evaluation computation. This computation data can be associated with a first layer of a neural network model, with subsequent layers each being associated with different computation data. Because the extraction computation data (Extr. Comp) has been designated for overwriting within the temporary memory, the evaluation computation data (Eval. Comp. 1) can fully or partially overwrite the extraction computation data (Extr. Comp.) previously stored in the temporary memory. Also at time T2, the output of the evaluation computation (Eval. Output 1) (e.g., an output of a first layer of a neural network model) is stored in the temporary memory.

At time T3, a second evaluation computation is performed (e.g., computing a second layer of a neural network model). During this process, the computations rely on the prior output (Eval. Output 1), and hence this data remains in the temporary memory. The evaluation computation data (Eval. Comp. 2) is written to temporary memory as well as the output of the computation (Eval. Output 2). Because the computational data of the prior layer (Eval. Comp. 1) was designated for being overwritten, the evaluation computation data (Eval. Comp. 2) and the computational output (Eval. Output 2) each overwrite a portion of the previously stored evaluation computation data (Eval. Comp. 1).

At time T4, the process described with respect to T3 iterates, such that the prior output (Eval. Output 2) is retained, while the new computational data (Eval. Comp. 3) overwrites the old computational data (Eval. Comp. 2), and the new output (Eval. Output 3) overwrites the output of two-layers prior (Eval. Output 1). In this simplified scenario, the computation at each layer requires only the outputs from the previous layer, and accordingly the outputs from two or more layers previous can be overwritten. In some embodiments, the computations at a given layer may have further dependencies, such that one or more outputs from previous layers must be maintained in temporary memory for a longer duration.

At time T5, the final layer of the feature evaluation (e.g., neural network model) is calculated. In this instance, the prior output (Eval. Output 3) is maintained in temporary memory and the computational data (Eval. Comp. 4) overwrites the previously stored outputs (Eval. Output 2) and/or computational data (Eval. Comp. 3). The final output (Eval. Output 4) is written into persistent memory. This output can reflect, for example, a classification or other output of the neural network model that is used for downstream processing in keyword detection.

The process illustrated as including times T0-T5 can reflect one computational cycle, which can be repeated iteratively with subsequent cycles. In subsequent cycles, data stored in persistent memory can be at least partially overwritten. As such, the extracted features (Extr. Output 1), evaluation inputs (Eval. Input 1), and evaluation outputs (Eval. Output 4) can be designated for being overwritten by subsequent processes. The input samples (Extr. Input 1) may not be designated to be (completely) overwritten because, as noted previously, the input to the feature extraction can include a window of input samples (e.g., a new input sample in addition to the previous N input samples). As such, the input sample from a previous computational cycle can remain within the persistent memory for use in subsequent computational cycles.

FIG. 11 illustrates one exemplary computational cycle in which the non-permanent memory includes a temporary memory portion that is a shared memory resource for computational data associated with both the feature evaluation process and the feature extraction process. In various embodiments, any or all of the data types described herein (e.g., the input samples, extraction computation, extracted features, evaluation inputs, evaluation computation, and/or evaluation output) can be stored in temporary memory so as to be designated for being overwritten within a single computational cycle. Such designation can significantly reduce the amount of total non-permanent memory required for operation of the keyword engine.

As shown in FIG. 11, at any given time, the data stored within the temporary memory and within the persistent memory may change. The total available memory capacity needed to perform these processes can be a function of the largest amount of memory required at any particular time. For example, the memory resources required for the extraction computation (Extr. Comp.) at time T1 are the greatest of any times shown in FIG. 11, and as such this can set a lower bound on the minimum amount of temporary memory required to perform these operations. For example, the memory usage of storing Extr. Comp. at time T1 can reflect utilizing 100% of the allocable temporary memory. Similarly, with respect to the persistent memory, time T5 reflects the greatest memory consumption, and as such the combined memory capacity required for the data stored at T5 can set a lower limit on the persistent memory resources required to complete these operations. For example, the memory usage of the combined data stored at time T5 can reflect utilizing 100% of the allocable persistent memory. In various embodiments, the particular relative amounts of memory required for each of the types of data shown in FIG. 11 may vary—for example with the data stored at T4 consuming the greatest amount of memory, and with the extraction computational data (Extr. Comp) at time T1 consuming less data.

Memory can be allocated in a particularly efficient manner when operations are well-defined in advance such that the total amount of memory required at any particular time is pre-defined. For example, if the data size of incoming sound samples is predefined, and the particular computations are pre-defined (e.g., involving matrix multiplication with matrices of known size), then the total amount of memory needed to store inputs, perform computations, and store outputs, can be known. As a result, memory resources can be precisely tailored to the requirements, eliminating the need for excess memory resources that would otherwise be required to avoid exceeding memory capacity.

In some embodiments, the memory requirements may depend at least in part on the particular size of a single frame of sound data. Memory components are often grouped into certain sizes, for example memory cells having a fixed word length of 32 bits, 64 bits, 128 bits, etc. If a single frame of sound data requires, for example, 40 bits, then the frame may require memory having a 64-bit word length for storage, as the 40 bits of data would exceed the capacity of single word in a memory having a 32-bit word length. As a result of this dynamic, it can be advantageous to select smaller frame sizes, and/or to select frame sizes that approach but do not exceed the memory capacity for a particular memory component (e.g., a word length). For example, a 60-bit frame of sound data and a 40-bit frame of sound data are both able to be stored using a single word of a 64-bit word length memory component. As such, it can be advantageous to utilize the 60-bit frame of sound data. Alternatively, while a 40-bit frame of sound data cannot be stored using a single word of a 32-bit word length component, reducing the size to a 30-bit frame of sound data would permit the data to be stored using a single word of a 32-bit word length memory component. Accordingly, the particular memory configuration (e.g., the selected word length of the memory) can be chosen to most efficiently utilize the available memory during keyword detection.

FIG. 12 illustrates another example memory allocation for the keyword detection process illustrated in FIGS. 9 and 10. The memory allocation shown in FIG. 12 may be similar to FIG. 11, except that in addition to sharing (e.g., allowing overwriting among) the computational space between the extraction and evaluation processes, the process reflected in FIG. 12 provides for sharing memory resources among the extracted features (Extr. Output; Eval. Input), evaluation output (Eval. Output), extraction computation data (Extr. Comp), and evaluation computation data (Eval. Comp). For example, each of these data types can be stored in temporary memory, and each can be designated to be overwritten by the others in subsequent operations, even within a single computational cycle. Additionally, the process shown in FIG. 12 can include certain computational context data (Cntxt) associated with computations performed at various layers of a neural network model or other feature evaluation process. This computational context data may be stored in persistent memory for use in subsequent computations. As shown in FIG. 12, at time T3, when the first feature evaluation computations are performed, the evaluation computational data (Eval. Comp 1) is stored in temporary memory and the computational context data (Cntxt 1) is stored in persistent memory. In some embodiments this context data (Cntxt 1) can be updated (e.g., re-written and/or overwritten with new values) with subsequent times, for example with the context data being updated based on the computation data or context data of a subsequent layer of a neural network model.

At time T4, the second computational context data (Cntxt 2) is stored in persistent memory while the second evaluation computational data (Eval. Comp 2) is stored in temporary memory, at least partially overwriting the previous evaluation computational data (Eval. Comp 1). This continues with third computational context data (Cntxt 3) and fourth computational context data (Cntxt 4) being stored in persistent memory.

As shown in FIG. 12, at any given time, the persistent memory stores at most the input samples for feature extraction and the evaluation inputs, and the temporary memory stores, at any one time, one or more of: extraction computation data (Extr. Comp), extracted features (Extr. Output), evaluation computation data (Eval. Comp), or evaluation output (Eval. Comp). Because these data can be overwritten in subsequent steps, the memory capacity allocated for the temporary memory need only be sufficient to meet the requirements of the largest amount of data required at any particular time. In the example shown in FIG. 12, time T1 consumes the greatest amount of memory, and as such the memory required at time T2 sets a lower bound on the amount of memory that must be available for this process. By allowing overwriting of certain data within a single computational cycle, significant memory resources can be freed up, resulting in lower overall memory requirements than would otherwise be possible.

Figure 13:
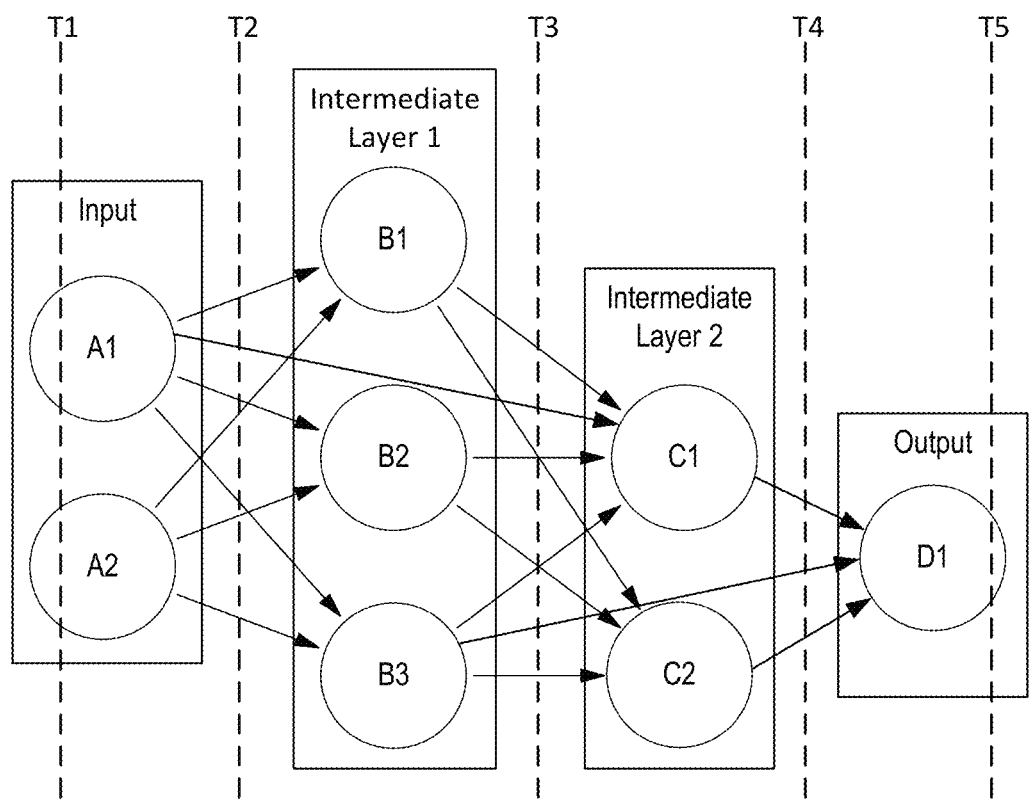
FIG. 13 is a schematic illustration of a neural network in accordance with aspects of the disclosure.

FIG. 13 is a schematic illustration of a simplified neural network model. As noted previously, a neural network model can be used for feature evaluation as part of keyword detection. As neural network models can be computationally- and memory-intensive, efficient memory allocation can be especially beneficial for keyword engines employing neural networks. As illustrated in FIG. 13, the basic architecture of a neural network includes one or more layers of interconnected nodes beginning with an input layer, one or more intermediate or hidden layers, and one or more output layers. The number of layers and the number of nodes per layer may be set as part of the neural network architecture. The settings (e.g., number of layers, connections between nodes of layers, etc.) for the architecture of a neural network are also referred to as hyperparameters.

A given node's value may be a function (sometimes referred to as an activation or transfer function) of the weighted sums of one or more node values in a previous layer. The value of a particular node (as calculated as a weighted sum), in turn, may be used as part of an input of a node in the next layer—again, with a weight applied to it. With reference to FIG. 13, the neural network includes an input layer with nodes A1 and A2, a first intermediate (or hidden) layer with nodes B1, B2, B3, a second intermediate layer with nodes C1 and C2, and an output layer with node D1. The various nodes are connected to one another as illustrated, with the nodes of each layer being connected to each of the nodes of the preceding layer. In addition, certain of the nodes are connected to a node of a further preceding layer. For example, node C2 of the second intermediate layer is connected to node A1 of the input layer, and the output node D1 is connected to the node B3 of the first intermediate layer. In the example of a keyword engine (e.g., keyword engine 771 of FIG. 7B), the inputs A1 and A2 can be extracted features (e.g., MFCCs), and the output D1 can include a classification such as a detected keyword.

Because computing each layer of a neural network requires memory, and because there may be a large number of nodes and/or layers for a particular neural network, the total amount of memory consumed by computation of a neural network model can be large. It can be advantageous to overwrite the data associated with previous layers of the neural network as the computation proceeds to subsequent layers. However, this can be complicated by scenarios in which one layer depends not only on the nodes from the immediately previous layers, but also on further previous layers. In such instances, certain further previous layer data must be maintained, thereby rendering more difficult the step of overwriting data associated with computing preceding layers of the neural network.

Because data generated within any particular layer of the neural network model need not be used for all downstream layers, certain data can be overwritten dynamically as the neural network model is calculated. However, the dependencies of different layers and different nodes may vary. For example, as shown in FIG. 13, the node C1 in intermediate layer 2 takes as an input the output of A1 in the input layer. As such, calculation at intermediate layer 2 depends on the input A1, notwithstanding the intervening intermediate layer 1. Similarly, the output D1 depends on the intermediate layer 1 due to the connection between node B3 and output D1.

Accordingly, at time T1, the values A1 and A2 can be stored in the temporary memory. At time T2, as the intermediate layer 1 is being calculated based on the inputs A1 and A2, the intermediate layer 1 calculations are also stored in temporary memory. At time T3, the intermediate layer 2 is calculated using intermediate layer 2 (nodes B1-B3) in addition to node A1 from the input layer. Since node A2 from the input layer is not used for this or any subsequent layers, node A2 in Portion 2 of the temporary memory can be overwritten (for example, being overwritten with the output of node B1). At time T4, the output layer is calculated using intermediate layer 2 and node B3 from the intermediate layer 1. As such, the value of node B3 can be retained in memory while the other values can be overwritten. At this stage, the intermediate layer 2 calculation is no longer needed, and may be designated for being overwritten as needed in subsequent operations. At time T5, after the output has been calculated, the value D1 can overwrite prior data (Portion 1), and the remaining data in temporary memory can be designated for being overwritten via subsequent processes as needed. This process can be relatively time-intensive, at least in part because of memory addressing and the need to refer to data from prior layers that may be stored at non-adjacent memory locations. However, the time-intensiveness of this process can provide the benefit of reduced memory requirements, due at least in part to overwriting certain values associated with computing layers of the neural network when those values are not needed for downstream operations. As such, a tradeoff between the time-intensiveness and memory-intensiveness of the neural network processing can be tailored to achieve the desired characteristics. In some cases, the increase in processing time associated with the process described above is justified by the savings in memory requirements.

Figure 14:
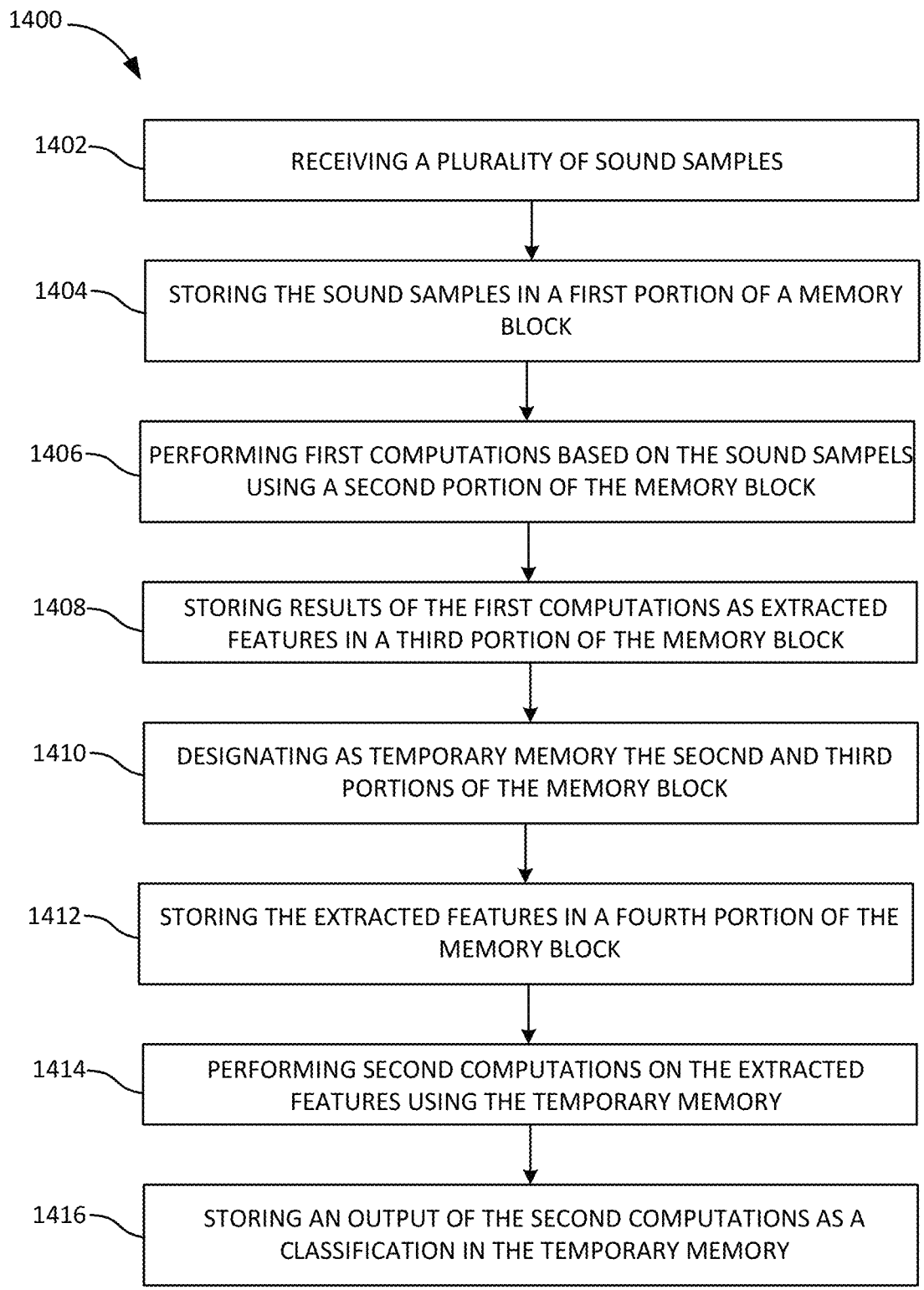
FIG. 14 is a flow diagram of an example method for keyword detection in accordance with aspects of the disclosure.

FIG. 14 is a flow diagram of an example method 1400 for keyword detection. In some embodiments, the process 1400 includes one or more instructions stored in memory and executed by one or more processors (e.g., the controller 781 of FIG. 7B; the processor 112a of FIG. 1) of an NMD (e.g., NMD 703 of FIG. 7B). Although the blocks are shown in a particular order, in some embodiments the steps may be performed in different orders. Additionally or alternatively, certain blocks may be omitted, combined, or sub-divided into separate blocks.

In block 1402, a plurality of sound samples are received. As described previously, sound samples can be captured via microphones of an NMD and packetized into frames of sound data for subsequent processing. In block 1404, the sound samples are stored in a first portion of a memory block. For example, a keyword engine can store the incoming sound samples (and optionally, the previous N sound samples) within memory. The memory can be, for example, temporary memory such as DRAM.

In block 1406, first computations are performed on the sound samples using a second portion of the memory block. For example, the first computations can take the form of applying a feature extraction algorithm (e.g., an MFCC algorithm or other suitable algorithm) to extract features from the sound samples for downstream processing via a feature evaluation algorithm such as a neural network model.

In block 1408, results of the first computations are stored as extracted features in a third portion of the memory block. In various examples, the first, second, and third portions of the memory block can be various non-overlapping portions of the same DRAM memory block.

In block 1410, the second and third portions of the memory block are designated as temporary. This designation can be performed dynamically and can vary over time, or the portions of the memory block that are temporary can be pre-designated such that the computations and the results thereof are written to the pre-defined temporary portions of the memory block. As noted elsewhere herein, "temporary" memory can include a portion of the non-permanent memory (e.g., DRAM) that is operably configured to be overwritten within a single computational cycle.

In block 1412, the extracted features (e.g., as output from block 1408) are stored in a fourth portion of the memory block, and in block 1414, second computations are performed on the extracted features using the temporary memory. In some embodiments, the second computations can take the form of applying a neural network model or other suitable classification algorithm to the extracted features, for example to detect keyword(s) in the sound data. These computations can use the previously designated temporary memory (e.g., at least a portion of the same memory portions with which the first computations were performed (block 1406) and/or the extracted features were stored (block 1408)). Accordingly, the second computations can be performed in a manner that at least partially overwrites the previously stored data.

In block 1416, the output of the second computations can be stored as a classification in the temporary memory. The output classification can include, for example, detected keyword(s) and associated confidence score(s). Since the output is stored in the temporary memory, storing this output can include at least partially overwriting one or more of: data associated with the first computations (block 1406), the extracted features (block 1408), and/or data associated with the second computations (block 1414).

V. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples may be combined in any combination, and placed into a respective independent example. The other examples can be presented in a similar manner.

Example 1: A method for detecting keywords in audio input using a dynamic random-access memory block, the method comprising: extracting features from a plurality of sound samples, the extraction comprising: receiving a plurality of sound samples; storing the sound samples in a first portion of the memory block; performing first computations based on spectral coefficients of the sound samples using a second portion of the memory block; and storing results of the first computations as extracted features in a third portion of the memory block; designating as temporary memory the second and third portions of the memory block; and processing the extracted features utilizing a neural network, the processing comprising: storing the extracted features in a fourth portion of the memory block; performing second computations on the extracted features using the temporary memory, the second computations comprising computing at least one layer of the neural network; and storing an output of the neural network as a classification in the temporary memory.

Example 2: The method of any one of the preceding Examples, wherein the first, second, third, and fourth portions of the memory block each comprises different pluralities of dynamic random-access cells within the memory block.

Example 3: The method of any one of the preceding Examples, wherein processing the extracted features utilizing the neural network comprises overwriting at least some of the temporary memory.

Example 4: The method of any one of the preceding Examples, wherein performing second computations on the extracted features using the temporary memory comprises overwriting data in at least a portion of the second or third portions of the memory block.

Example 5: The method of any one of the preceding Examples, wherein, at a first time, extracting the features from the plurality of sound samples utilizes at least 90% of the temporary memory, and at a second time, processing the extracted features utilizing the neural network utilizes at least 90% of the temporary memory.

Example 6: The method of any one of the preceding Examples, wherein performing the second computations on the extracted features comprises retrieving weights of the neural network from a memory resource separate from the dynamic random-access memory block.

Example 7: The method of any one of the preceding Examples, wherein the sound samples comprise voice input, the method further comprising identifying a keyword in the voice input based on the output of the neural network.

Example 8: The method of any one of the preceding Examples, wherein performing the second computations comprises: processing a first layer of the neural network using inputs stored in a first persistent memory region and a first portion of the temporary memory, wherein the processing has a first lifetime; processing a second layer of the neural network using a second persistent memory region and a second portion of the temporary memory, wherein the processing has a second lifetime; and processing a third layer of the neural network using a third persistent memory region and a third portion of the temporary memory, wherein the third portion of the temporary memory includes at least part of the first portion of the temporary memory, and wherein processing the third layer of the neural network occurs after expiry of the second lifetime.

Example 9: Tangible, non-transitory computer-readable medium storing instructions that, when executed by one or more processors of a device, cause the device to perform operations comprising a method of any one of the preceding Examples.

Example 10: A device configured to detect keywords in sound samples, the device comprising: one or more microphones; one or more processors; a dynamic random-access memory block; and a computer-readable memory storing instructions that, when executed by the one or more processors, cause the device to perform operations comprising a method of any one of the preceding Examples.

The invention claimed is:

1. A network microphone device (NMD) comprising:
one or more microphones;
one or more processors;
a dynamic random-access memory (DRAM) block; and
a computer-readable memory storing instructions that, when executed by the one or more processors, cause the device to perform operations comprising:
  capturing a sound-data stream via the one or more microphones;
  utilizing a first memory allocation scheme, performing first processing of the sound-data stream via a wake-word engine to detect a wake word associated with a voice assistant service (VAS);
  concurrently with the first processing of the sound-data stream via the wake-word engine, and utilizing a second memory allocation scheme different from the first memory allocation scheme, performing second processing of the sound-data stream via a keyword engine to detect a command keyword, wherein the second memory allocation scheme enables at least a portion of data in the DRAM block to be overwritten dynamically during the second processing of the sound-data stream via the keyword engine;
  determining, based on the first processing of the sound-data stream via the keyword engine, that the sound-data stream includes voice input data comprising a command keyword; and
  responsive to determining that the sound-data stream includes voice input data comprising the command keyword, causing the NMD to perform a command corresponding to the command keyword.

2. The NMD of claim 1, wherein the second processing comprises extracting features from the sound-data stream and analyzing the extracted features utilizing a neural network.

3. The NMD of claim 2, wherein extracting features from the sound-data stream comprises storing data in a temporary memory of the DRAM block, and wherein analyzing the extracted features utilizing the neural network comprises overwriting at least some of the temporary memory.

4. The NMD of claim 2, wherein the second processing further comprises:
designating a portion of the DRAM block as temporary memory;
at a first time, extracting the features from the sound-data stream utilizing at least 90% of the temporary memory; and
at a second time, processing the extracted features utilizing the neural network utilizing at least 90% of the temporary memory.

5. The NMD of claim 2, wherein:
the extraction comprises:
  storing sound samples of the sound-data stream in a first portion of the DRAM block;
  performing first computations on the sound samples using a second portion of the DRAM block; and
  storing results of the first computations as extracted features in a third portion of the DRAM block; and
analyzing the extracted features utilizing the neural network comprises:
  storing the extracted features in a fourth portion of the DRAM block;
  performing second computations on the extracted features using at least one of the second portion or third portion of the DRAM block; and
  storing an output of the neural network as a classification at least one of the second portion or third portion of the DRAM block.

6. The NMD of claim 1, wherein performing the first processing of the sound-data stream utilizing the first memory allocation scheme comprises allocating discrete, non-overlapping portions of the DRAM block to different data types.

7. The NMD of claim 6, wherein the different data types comprise one or more of:
input sound samples for feature extraction;
computations associated with feature extraction;
outputs of extracted features;
one or more inputs to a feature evaluation algorithm;
computations associated with feature evaluation; or
outputs of the feature evaluation.

8. A method performed by a network microphone device (NMD) comprising a dynamic random-access memory (DRAM) block, the method comprising:
   capturing a sound-data stream via one or more microphones of the NMD;
   utilizing a first memory allocation scheme, performing first processing of the sound-data stream via a wake-word engine of the NMD to detect a wake word associated with a voice assistant service (VAS);
   concurrently with the first processing of the sound-data stream via the wake-word engine, and utilizing a second memory allocation scheme different from the first memory allocation scheme, performing second processing of the sound-data stream via a keyword engine of the NMD to detect a command keyword, wherein the second memory allocation scheme enables at least a portion of data in the DRAM block to be overwritten dynamically during the second processing of the sound-data stream via the keyword engine;
   determining, based on the first processing of the sound-data stream via the keyword engine, that the sound-data stream includes voice input data comprising a command keyword; and
   responsive to determining that the sound-data stream includes voice input data comprising the command keyword, causing the NMD to perform a command corresponding to the command keyword.

9. The method of claim 8, wherein the second processing comprises extracting features from the sound-data stream and analyzing the extracted features utilizing a neural network.

10. The method of claim 9, wherein extracting features from the sound-data stream comprises storing data in a temporary memory of the DRAM block, and wherein analyzing the extracted features utilizing the neural network comprises overwriting at least some of the temporary memory.

11. The method of claim 9, wherein the second processing further comprises:
   designating a portion of the DRAM block as temporary memory;
   at a first time, extracting the features from the sound-data stream utilizing at least 90% of the temporary memory; and
   at a second time, processing the extracted features utilizing the neural network utilizing at least 90% of the temporary memory.

12. The method of claim 9, wherein:
   the extraction comprises:
      storing sound samples of the sound-data stream in a first portion of the DRAM block;
      performing first computations on the sound samples using a second portion of the DRAM block; and
      storing results of the first computations as extracted features in a third portion of the DRAM block; and
   analyzing the extracted features utilizing the neural network comprises:
      storing the extracted features in a fourth portion of the DRAM block;
      performing second computations on the extracted features using at least one of the second portion or third portion of the DRAM block; and
      storing an output of the neural network as a classification at least one of the second portion or third portion of the DRAM block.

13. The method of claim 8, wherein performing the first processing of the sound-data stream utilizing the first memory allocation scheme comprises allocating discrete, non-overlapping portions of the DRAM block to different data types.

14. The method of claim 13, wherein the different data types comprise one or more of:
   input sound samples for feature extraction;
   computations associated with feature extraction;
   outputs of extracted features;
   one or more inputs to a feature evaluation algorithm;
   computations associated with feature evaluation; or
   outputs of the feature evaluation.

15. A tangible, non-transitory computer-readable medium storing instructions that, when executed by one or more processors of a network microphone device (NMD) comprising a dynamic random-access memory (DRAM) block, cause the NMD to perform operations comprising:
   capturing a sound-data stream via one or more microphones of the NMD;
   utilizing a first memory allocation scheme, performing first processing of the sound-data stream via a wake-word engine of the NMD to detect a wake word associated with a voice assistant service (VAS);
   concurrently with the first processing of the sound-data stream via the wake-word engine, and utilizing a second memory allocation scheme different from the first memory allocation scheme, performing second processing of the sound-data stream via a keyword engine of the NMD to detect a command keyword, wherein the second memory allocation scheme enables at least a portion of data in the DRAM block to be overwritten dynamically during the second processing of the sound-data stream via the keyword engine;
   determining, based on the first processing of the sound-data stream via the keyword engine, that the sound-data stream includes voice input data comprising a command keyword; and
   responsive to determining that the sound-data stream includes voice input data comprising the command keyword, causing the NMD to perform a command corresponding to the command keyword.

16. The computer-readable medium of claim 15, wherein the second processing comprises extracting features from the sound-data stream and analyzing the extracted features utilizing a neural network.

17. The computer-readable medium of claim 16, wherein extracting features from the sound-data stream comprises storing data in a temporary memory of the DRAM block, and wherein analyzing the extracted features utilizing the neural network comprises overwriting at least some of the temporary memory.

18. The computer-readable medium of claim 16, wherein the second processing further comprises:
   designating a portion of the DRAM block as temporary memory;
   at a first time, extracting the features from the sound-data stream utilizing at least 90% of the temporary memory; and
   at a second time, processing the extracted features utilizing the neural network utilizing at least 90% of the temporary memory.

19. The computer-readable medium of claim 16, wherein:
   the extraction comprises:
      storing sound samples of the sound-data stream in a first portion of the DRAM block;
      performing first computations on the sound samples using a second portion of the DRAM block; and storing results of the first computations as extracted features in a third portion of the DRAM block; and analyzing the extracted features utilizing the neural network comprises:

storing the extracted features in a fourth portion of the DRAM block;

performing second computations on the extracted features using at least one of the second portion or third portion of the DRAM block; and storing an output of the neural network as a classification at least one of the second portion or third portion of the DRAM block.

20. The computer-readable medium of claim 15, wherein performing the first processing of the sound-data stream utilizing the first memory allocation scheme comprises allocating discrete, non-overlapping portions of the DRAM block to different data types.

* * * * *